(12) United States Patent
Kikuchi et al.

(10) Patent No.: US 11,121,637 B2
(45) Date of Patent: Sep. 14, 2021

(54) POWER CONVERSION DEVICE AND POWER CONVERSION SYSTEM INCLUDING A POWER CONVERTER CAPABLE OF CONVERTING BETWEEN ALTERNATING-CURRENT (AC) POWER AND DIRECT-CURRENT (DC) POWER

(71) Applicant: Mitsubishi Electric Corporation, Chiyoda-ku (JP)

(72) Inventors: Takeshi Kikuchi, Chiyoda-ku (JP); Toshiyuki Fujii, Chiyoda-ku (JP); Ryosuke Uda, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/631,196

(22) PCT Filed: Sep. 11, 2017

(86) PCT No.: PCT/JP2017/032686
§ 371 (c)(1),
(2) Date: Jan. 15, 2020

(87) PCT Pub. No.: WO2019/049368
PCT Pub. Date: Mar. 14, 2019

(65) Prior Publication Data
US 2020/0220471 A1 Jul. 9, 2020

(51) Int. Cl.
*H02M 5/458* (2006.01)
*H02M 7/483* (2007.01)
(Continued)

(52) U.S. Cl.
CPC ........... *H02M 5/4585* (2013.01); *H02M 1/36* (2013.01); *H02M 7/219* (2013.01); *H02M 7/483* (2013.01); *H02M 7/4835* (2021.05)

(58) Field of Classification Search
CPC ............ H02M 7/00; H02M 7/48; H02M 1/36; H02M 5/458; H02M 2007/4835;
(Continued)

(56) References Cited

U.S. PATENT DOCUMENTS

| 2009/0121549 | A1* | 5/2009 | Leonard | .................. H02J 3/381 |
| | | | | 307/51 |
| 2013/0208519 | A1* | 8/2013 | Yamamoto | ............ H02M 7/217 |
| | | | | 363/67 |

(Continued)

FOREIGN PATENT DOCUMENTS

| EP | 2 887 526 A1 | 6/2015 |
| EP | 3 070 827 A1 | 9/2016 |
| JP | 2016-174495 A | 9/2016 |

OTHER PUBLICATIONS

International Search Report dated Nov. 14, 2017 in PCT/JP2017/032686 filed Sep. 11, 2017.

(Continued)

*Primary Examiner* — Gustavo A Rosario-Benitez
(74) *Attorney, Agent, or Firm* — Xsensus LLP

(57) ABSTRACT

A power conversion system includes a first power converter and a second power converter which are capable of converting an alternating-current power into a direct-current power or converting a DC power into an AC power. The first power converter is interconnectable to a first AC system via a first AC circuit breaker. The second power converter is interconnectable to a second AC system via a second AC circuit breaker. A first DC terminal of the first power converter and a second DC terminal of the second power converter are connectable. The first power converter begins operation prior to the second power converter. A first control device controls a voltage of the first DC terminal, based on a status of the second power converter sent from a second control device.

18 Claims, 15 Drawing Sheets

(51) Int. Cl.
*H02M 1/36* (2007.01)
*H02M 7/219* (2006.01)

(58) Field of Classification Search
CPC ...... H02M 7/483; H02M 7/49; H02M 7/5375; H02M 7/66; H02M 2001/0067; H02M 2001/007; H02M 5/40; H02M 5/45; H02M 7/25; H02M 7/517; H02J 3/36; H02J 3/38; H02J 13/0006; H02J 2003/365; H02J 3/40; H02J 3/382; H02J 3/383; H02J 3/385; H02J 3/386; H02J 3/387

See application file for complete search history.

(56) References Cited

U.S. PATENT DOCUMENTS

| | | | | |
|---|---|---|---|---|
| 2014/0078796 | A1* | 3/2014 | Inoue | H02M 5/4585 363/68 |
| 2014/0268888 | A1* | 9/2014 | Lv | H02M 1/088 363/10 |
| 2015/0138843 | A1* | 5/2015 | Inoue | H02M 3/33584 363/21.01 |
| 2016/0313387 | A1* | 10/2016 | Schweizer | G01R 31/64 |
| 2017/0149344 | A1* | 5/2017 | Pu | H02M 5/458 |
| 2017/0163171 | A1* | 6/2017 | Park | H02M 7/483 |
| 2017/0288569 | A1* | 10/2017 | Uda | H02M 1/32 |
| 2017/0294847 | A1* | 10/2017 | Xie | H02M 5/293 |
| 2017/0331393 | A1* | 11/2017 | Whitehouse | H02M 7/517 |
| 2018/0076619 | A1* | 3/2018 | Gupta | H02J 1/02 |
| 2018/0115164 | A1* | 4/2018 | Gupta | H02M 1/36 |
| 2018/0120367 | A1* | 5/2018 | Lewis | G01R 31/085 |
| 2018/0159424 | A1* | 6/2018 | Kolar | H02M 1/36 |
| 2018/0212533 | A1* | 7/2018 | Nami | H02M 7/483 |
| 2019/0146564 | A1* | 5/2019 | Arndt | G06F 1/30 713/340 |

OTHER PUBLICATIONS

Extended European Search Report dated Sep. 17, 2020 in European Patent Application No. 17924487.6, 15 pages.

* cited by examiner

| | SWITCH STATE | | VPN |
|---|---|---|---|
| | 21s | 22s | |
| MODE 1 | ON | OFF | VcapA |
| MODE 2 | OFF | ON | 0 |

| | SWITCH STATE | | | VPN |
|---|---|---|---|---|
| | 31s | 32s | 34s | |
| MODE 1 | ON | OFF | ON | VcapA |
| MODE 2 | OFF | ON | ON | 0 |

| | SWITCH STATE | | | | VPN |
|---|---|---|---|---|---|
| | 41s | 42s | 43s | 44s | |
| MODE 1 | ON | OFF | OFF | ON | VcapA |
| MODE 2 | OFF | ON | ON | OFF | −VcapA |
| MODE 3 | ON | OFF | ON | OFF | 0 |
| MODE 4 | OFF | ON | OFF | ON | 0 |

POWER CONVERSION DEVICE AND POWER CONVERSION SYSTEM INCLUDING A POWER CONVERTER CAPABLE OF CONVERTING BETWEEN ALTERNATING-CURRENT (AC) POWER AND DIRECT-CURRENT (DC) POWER

TECHNICAL FIELD

The present invention relates to a power conversion device and a power conversion system, and, more particularly, to a power conversion device having an arm which includes a transducer cell formed of a plurality of semiconductor switches and a DC capacitor and converts power between an alternating-current (AC) power and a direct-current (DC) power, and a power conversion system which includes a plurality of the power conversion devices.

BACKGROUND ART

In large capacity power conversion devices, output of a power converter is a high voltage or a large current, and thus multiple power converters may be multiplexed in series or in parallel. Multiplexing the power converters not only increases the capacities of the power converters, but also combines the outputs of the power converters, thereby allowing for reduction in harmonics contained in output voltage waveforms. As a result, harmonic currents flowing out to the system can be reduced.

Methods for multiplexing the power converters include reactor multiplexing, transformer multiplexing, direct multiplexing, etc. As power transformers are multiplexed, the AC sides of the power converters are insulated by the transformers, and thus the direct current of each power converter can be shared. However, if the output voltage is a high voltage, the configuration of the multiplexed power transformers is complicated and the cost increases.

Thus, as a power conversion device that is suitable for high voltage applications and does not require multiplexed power transformers, a multilevel converter is known in which outputs of multiple power converters are cascaded. One type of the multilevel converter is a modular multilevel converter.

The modular multilevel converter (hereinafter, referred to as MMC) includes an arm in which multiple unit converters (hereinafter, referred to as transducer cells), called cells, are cascaded. The transducer cells each include multiple semiconductor switching elements and a DC capacitor. The transducer cell outputs the voltage across the DC capacitor or zero voltage by switching the semiconductor switching elements.

The DC capacitor in each transducer cell is charged at two phases. Initially, the MMC charges the DC capacitor to the rating with power from an AC system by a diode rectifier operation, without performing a switching control. The MMC thereafter charges the DC capacitor to the rating, by the switching control.

Generally, first, a circuit breaker (hereinafter, referred to as a DC circuit breaker) at a DC terminal of the MMC is opened and thereby isolated from the DC system, which turns on a circuit breaker (hereinafter, referred to as an AC circuit breaker) at an AC terminal to charge the MMC with power from the AC system. The MMC is thereafter controlled so as to output a rated voltage to an AC terminal and a DC terminal. Last, the DC circuit breaker is turned on and the MMC is started up.

At this time, if there is a potential difference between voltages across the DC circuit breaker, inrush current may flow into the MMC, ending up with destroying the semiconductor switching elements. In order to solve this, a startup method is known in which a control is performed so that the potential difference between the voltages at the terminals of the DC circuit breaker is reduced, and the DC circuit breaker is turned on when the potential difference decreases to a constant value or less (e.g., see PTL 1).

CITATION LIST

Patent Literature

PTL 1: Japanese Patent Laying-Open No. 2016-174495

SUMMARY OF INVENTION

Technical Problem

In PTL 1, upon a startup, a control is performed so that the power converter reduces the potential difference between the terminals of the DC circuit breaker, and the DC circuit breaker is turned on when the potential difference decreases to a constant value or less, thereby the power converter interconnecting with the DC system. In this startup method, inrush current, upon interconnection of the power converter with a DC system, which flows into other power converters is reduced, thereby allowing for a stable startup.

In contrast, a system (BTB: Back to Back, etc.), in which multiple power converters and a DC system is directly connected, does not include a DC circuit breaker. Accordingly, the startup method, as disclosed in PTL 1, in which the power converter controls the DC voltage and establishes the interconnection using a DC circuit breaker, is not applicable.

In other words, in a system in which the power converter is directly connected to the DC system, the DC voltages of all the power converters connected to the DC system are the same. Thus, the DC voltages of all the power converter need to be controlled simultaneously.

However, if each power converter is interconnected to a different AC system, it is not easy to control the DC voltages due to errors in timing at which AC circuit breakers are turned on and delay in communications, etc. Even if each power converter is interconnected to the same system, an amount of charge with power from the AC system increases when the AC circuit breakers connected to the power converters are turn on simultaneously. Thus, in order to reduce the charging current, the timing of turning on the AC circuit breakers need to be staggered, ending up complicating the control.

The present invention is made to solve problems as the above, and an object of the present invention is to provide a power conversion device which can reduce inrush current upon interconnection with a DC system, and a power conversion system which includes a plurality of the power conversion devices.

Solution to Problem

A power conversion system according to the present invention includes: a first power converter capable of converting an alternating-current (AC) power into a direct-current (DC) power or converting a DC power into an AC power; a second power converter capable of converting an AC power into a DC power or converting a DC power into an AC power; a first control device that controls the first power converter; and a second control device that controls the second power converter. The first power converter is interconnectable to a first AC system via a first AC circuit breaker, the second power converter is interconnectable to a second AC system via a second AC circuit breaker, and a first DC terminal of the first power converter and a second DC terminal of the second power converter are connectable to each other. The first power converter and the second power converter each include a plurality of arms connected in parallel between a positive DC bus and a negative DC bus. The plurality of arms each include a positive arm and a negative arm which are connected in series. The positive arm and the negative arm each include one or more transducer cells which are connected in series. The transducer cells each include: a series body comprising a plurality of semiconductor switching elements connected in series; and a DC capacitor connected in parallel with the series body. The first power converter begins operation prior to the second power converter. The first control device controls a voltage of the first DC terminal, based on a status of the second power converter sent from the second control device.

Advantageous Effects of Invention

According to the present invention, the first power converter begins operation prior to the second power converter, and the first control device controls the voltage of the first DC terminal based on a status of the second power converter sent from the second control device, thereby reducing inrush current that flows into the second power converter upon interconnection of the first power conversion device and the second power conversion device to a DC system connecting the first DC terminal and the second DC terminal.

DESCRIPTION OF EMBODIMENTS

Embodiments according to the present invention will be described, with reference to the accompanying drawings.

Embodiment 1

Figure 1:
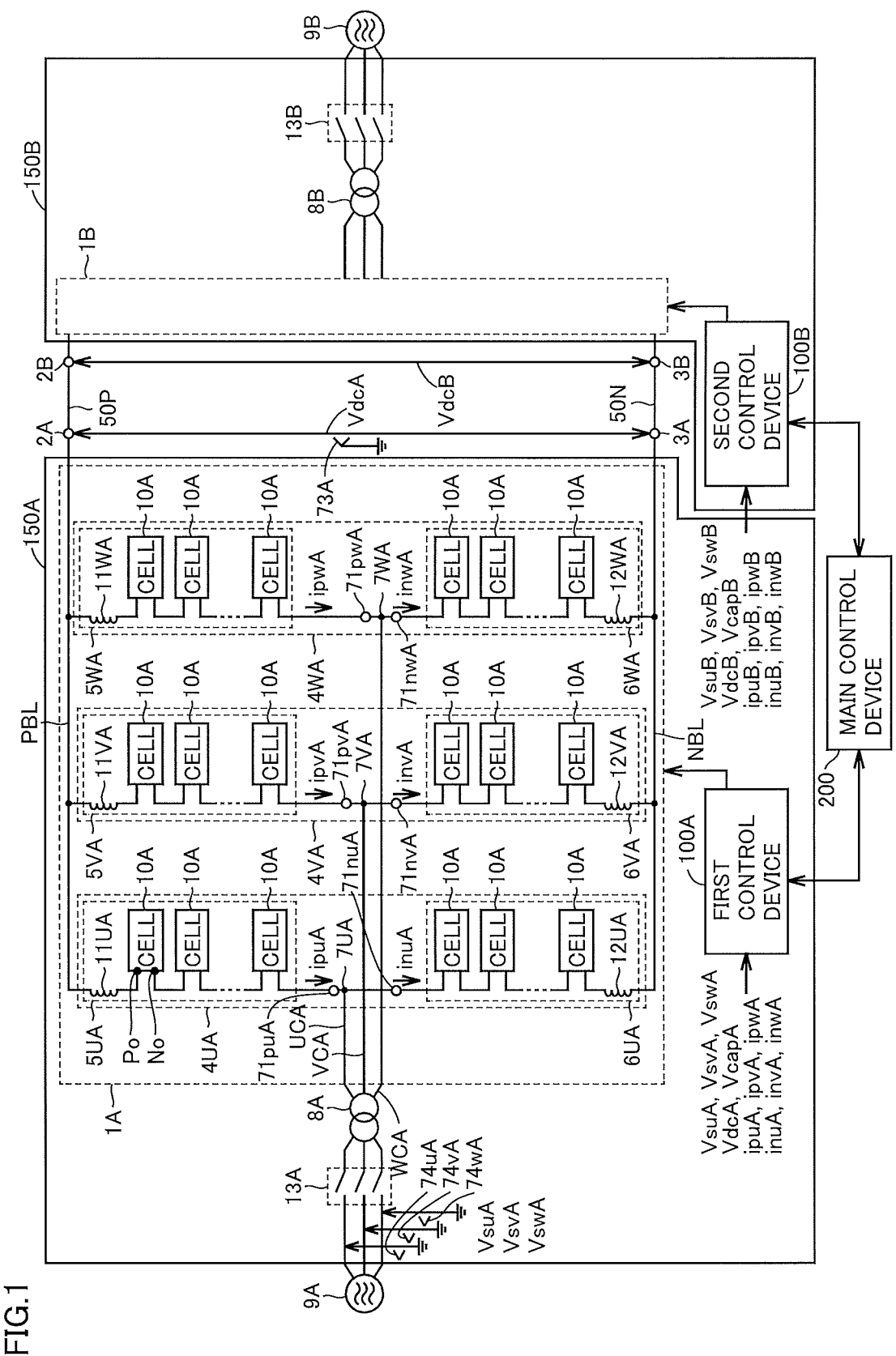
FIG. 1 is a schematic configuration diagram of a power conversion system according to Embodiment 1.
Figure 2:
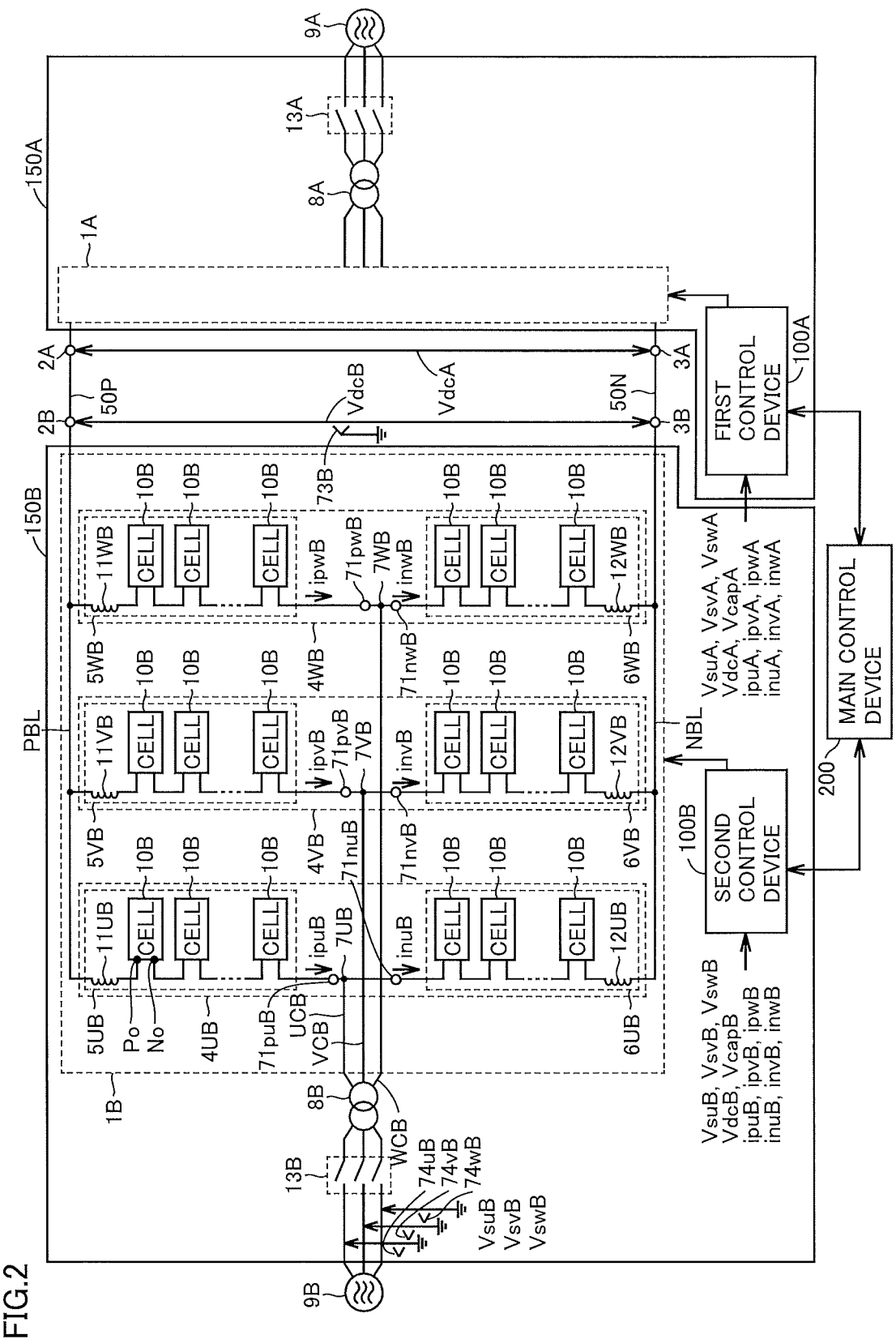
FIG. 2 is a schematic configuration diagram of the power conversion system according to Embodiment 1.

FIGS. 1 and 2 are schematic configuration diagrams of a power conversion system according to Embodiment 1. The power conversion system is a BTB system in which a first power converter 1A and a second power converter 1B are directly connected, without a direct-current (DC) system and a DC transmission line in between.

The power conversion system includes a power conversion device 150A, a power conversion device 150B, and a main control device 200.

Power conversion device 150A includes a first power converter 1A which is a main circuit, a first control device 100A which controls first power converter 1A, an interconnection transformer 8A, and an alternating-current (AC) circuit breaker 13A. Power conversion device 150B includes: a second power converter 1B which is a main circuit; a second control device 100B which controls second power converter 1B; an interconnection transformer 8B; and an AC circuit breaker 13B. Main control device 200 is connected to first control device 100A and second control device 100B by communication lines, and controls first control device 100A and second control device 100B.

First power converter 1A is connected to an AC system 9A. Second power converter 1B is connected to an AC system 9B. First positive DC terminal 2A and second positive DC terminal 2B are directly connected to each other by a line 50P which is a DC system, without a DC transmission line in between. A first negative DC terminal 3A and a second negative DC terminal 3B are directly connected to each other by a line 50N which is a DC system, without a DC transmission line in between.

First power converter 1A and AC system 9A are interconnected, and second power converter 1B and AC system 9B are interconnected.

In the following, a configuration and operation of first power converter 1A will be described. However, second power converter 1B has the same configuration as first power converter 1A, and operates in the same manner.

First power converter 1A converts power between a three-phase alternating current and a direct current. The AC side of first power converter 1A is connected to a three-phase AC system 9A, which is a three-phase AC circuit system, via interconnection transformer 8A and AC circuit breaker 13A. First power converter 1A is capable of converting an AC power from AC system 9A into a DC power, and supplying the DC power to the DC system, and converting a DC power from the DC system into an AC power and supplying the AC power to AC system 9A.

Second power converter 1B converts power between a three-phase alternating current and a direct current. The AC side of second power converter 1B is connected to a three-phase AC system 9B, which is a three-phase AC circuit system, via interconnection transformer 8B. Second power converter 1B is capable of converting an AC power from AC system 9B into a DC power and supplying the DC power to the DC system, and converting a DC power from the DC system into an AC power and supplying the AC power to AC system 9B.

First power converter 1A includes three phase arms 4UA, 4VA, 4WA.

Three phase arms 4UA, 4VA, 4WA are connected in parallel between a positive DC bus PBL and a negative DC bus NBL. Positive DC bus PBL is connected to positive first DC terminal 2A, and negative DC bus NBL is connected to first negative DC terminal 3A.

Arm 4UA includes a positive arm 5UA and a negative arm 6UA. Arm 4VA includes a positive arm 5VA and a negative arm 6VA. Arm 4WA includes a positive arm 5WA and a negative arm 6WA.

Positive arm 5UA and negative arm 6UA are connected in series. An AC terminal 7UA, which is a point of connection between positive arm 5UA and negative arm 6UA, is connected to a U-phase AC line UCA. Positive arm 5VA and negative arm 6VA are connected in series. An AC terminal 7VA, which is a point of connection between positive arm 5VA and negative arm 6VA, is connected to a V-phase AC line VCA. Positive arm 5WA and negative arm 6WA are connected in series. An AC terminal 7WA, which is a point of connection between positive arm 5WA and negative arm 6WA, is connected to a W-phase AC line WCA.

Positive arms 5UA, 5VA, 5WA and negative arms 6UA, 6VA, 6WA each include one or more transducer cells 10A connected in series.

Arm 4UA includes one or more transducer cells 10A connected in series and reactors 11UA, 12UA. Reactors 11UA, 12UA may be inserted anywhere within arm 4UA. As shown in FIG. 1, one of reactors 11UA, 12UA may be inserted in positive arm 5UA and the other may be inserted in negative arm 6UA. Alternatively, both reactors 11UA, 12UA may be inserted in positive arm 5UA or in negative arm 6UA.

Arm 4VA includes one or more transducer cells 10A connected in series and reactors 11VA, 12VA. Reactors 11VA, 12VA may be inserted anywhere within arm 4VA. As shown in FIG. 1, one of reactors 11VA, 12VA may be inserted in positive arm 5VA, and the other may be inserted in negative arm 6VA. Alternatively, both reactors 11VA, 12VA may be inserted in positive arm 5VA or in negative arm 6VA.

Arm 4WA includes one or more transducer cells 10A connected in series and reactors 11WA, 12WA. Reactors 11WA, 12WA may be inserted anywhere within arm 4WA. As shown in FIG. 1, one of reactors 11WA, 12WA may be inserted in positive arm 5WA, and the other may be inserted in negative arm 6WA. Alternatively, both reactors 11WA, 12WA may be inserted in positive arm 5WA or in negative arm 6WA.

First control device 100A includes a voltage command value generation unit 181 and a PWM (Pulse Width Modulation) circuitry 182. First control device 100A generates a gate signal, and controls transducer cells 10A included in positive arms 5UA, 5VA, 5WA and negative arms 6UA, 6VA, 6WA. A detailed configuration of first control device 100A will be described below.

Positive arm currents ipuA, ipvA, ipwA flowing through positive arms 5UA, 5VA, 5WA are detected by current detectors 71pUA, 71pVA, 71pWA, respectively, and sent to control device 100.

Negative arm currents inuA, invA, inwA flowing through negative arms 6UA, 6VA, 6WA are detected by current detectors 71nUA, 71nVA, 71nWA, respectively, and sent to first control device 100A.

Three phase voltages VsuA, VsvA, VswA of AC system 9A are detected by voltage detectors 74UA, 74VA, 74WA and sent to first control device 100A.

DC voltage VdcA between first positive DC terminal 2A and first negative DC terminal 3A is detected by a voltage detector 73A and sent to first control device 100A. DC voltage VdcB between second positive DC terminal 2B and second negative DC terminal 3B is detected by a voltage detector 73B and sent to main control device 200.

The three phase AC currents of AC system 9A and DC currents may be detected by current detectors not shown, or determined by computing positive arm currents ipuA, ipvA, ipwA, and negative arm currents inuA, invA, inwA.

Figures 3, 4:
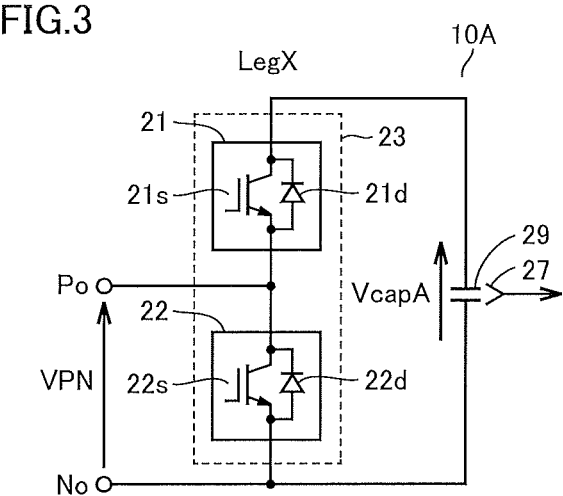
FIG. 3 is a diagram representing a configuration example of a transducer cell 10A according to Embodiment 1.
FIG. 4 is a diagram representing a relationship between modes and operations of transducer cell 10A according to Embodiment 1.

FIG. 3 is a diagram representing a configuration example of transducer cell 10A according to Embodiment 1. A transducer cell 10B has the same configuration as transducer cell 10A.

Transducer cell 10A has a half-bridge configuration.

Transducer cell 10A includes a series body 23 and a DC capacitor 29 which are connected in parallel. In the following description, series body 23 may be referred to as LegX.

DC capacitor 29 smoothes DC voltage.

Series body 23 includes a switch 21 and a switch 22 which are connected in series.

Switch 21 includes a semiconductor switching element 21s and a diode 21d connected in anti-parallel with semiconductor switching element 21s.

Switch 22 includes a semiconductor switching element 22s and a diode 22d connected in anti-parallel with semiconductor switching element 22s.

Self turn-off elements, such as IGBT (Insulated Gate Bipolar Transistor) or GCT (Gate Commutated Turn-off Thyristor), are used as semiconductor switching elements 21s, 22s.

As first power converter 1A begins operation, semiconductor switching elements 21s, 22s switch on or off.

In transducer cell 10A according to Embodiment 1, semiconductor switching elements 21s, 22s turn on or off, thereby causing the voltage across DC capacitor 29 or zero voltage to be output from terminals Po, No of semiconductor switching element 22s. While one transducer cell 10A and one transducer cell 10B have terminals Po, No in FIGS. 1 and 2, the other transducer cells 10A and the other transducer cells 10B have terminals Po, No as well.

Voltage VcapA across DC capacitor 29 included in transducer cell 10A is detected by a voltage detector 27 and sent to first control device 100A.

FIG. 4 is a diagram representing a relationship between modes and operations of transducer cell 10A according to Embodiment 1.

In mode 1, semiconductor switching element 21s is on, and semiconductor switching element 22s is off. At this time, a voltage between terminals Po, No is, generally, voltage VcapA across DC capacitor 29.

In mode 2, semiconductor switching element 21s is off, and semiconductor switching element 22s is on. At this time, the voltage between terminals Po, No is, generally, zero voltage (0).

Figure 5:
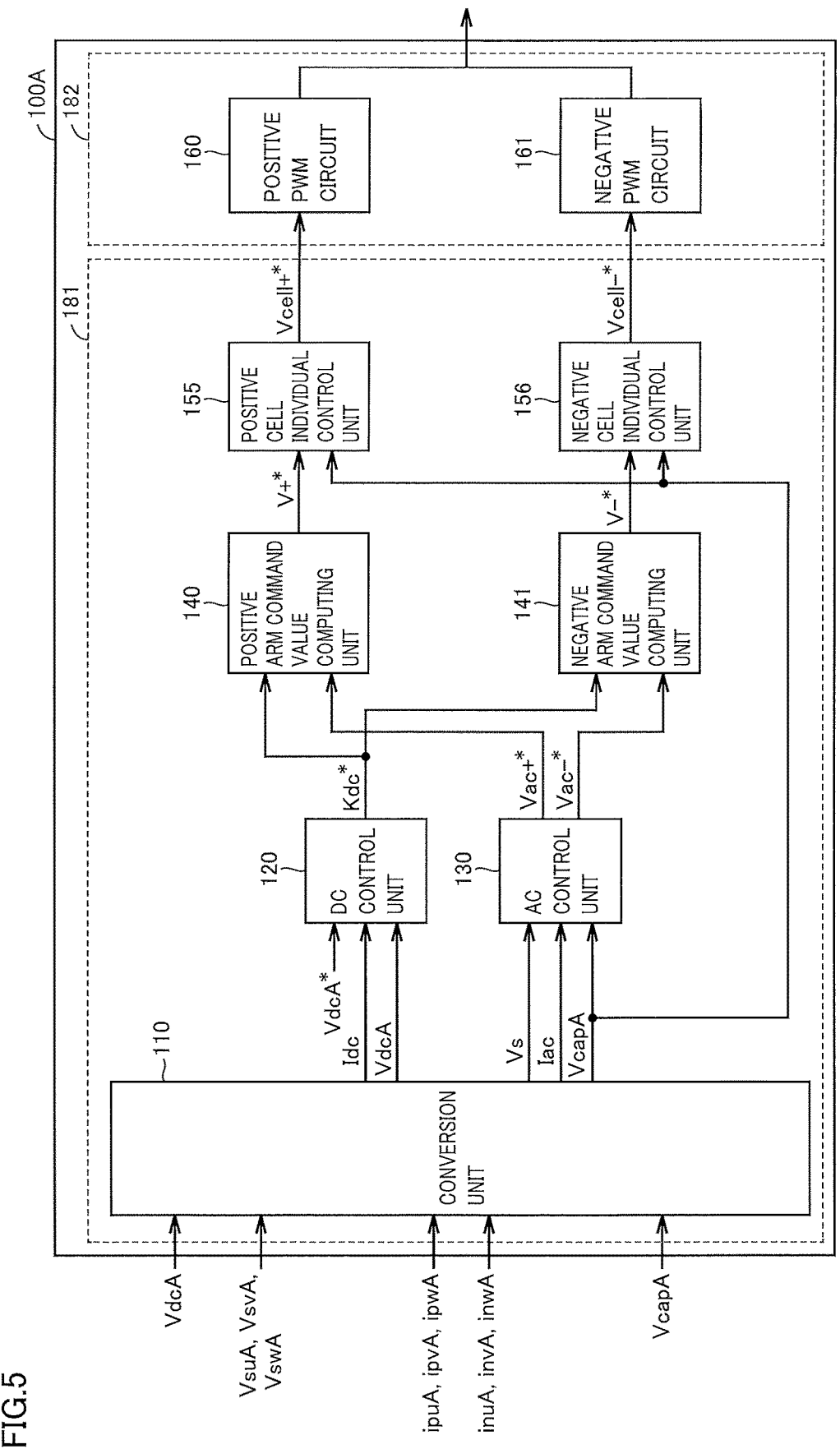
FIG. 5 is a block diagram of a configuration example of a first control device 100A.

FIG. 5 is a block diagram of a configuration example of first control device 100A. Second control device 100B has the same configuration as first control device 100A.

First control device 100A includes a voltage command value generation unit 181 and a PWM circuitry 182.

Voltage command value generation unit 181 includes a conversion unit 110, a DC control unit 120, an AC control unit 130, a positive arm command value computing unit 140, a negative arm command value computing unit 141, a positive cell individual control unit 155, and a negative cell individual control unit 156. PWM circuitry 182 includes a positive PWM circuit 160 and a negative PWM circuit 161.

Conversion unit 110 converts detected current value and voltage value into signals for use in the control. Conversion unit 110 receives DC voltage VdcA between first positive DC terminal 2A and first negative DC terminal 3A, three phase voltages VsuA, VsvA, VswA of AC system 9A, positive arm currents ipuA, ipvA, ipwA, negative arm currents inuA, invA, inwA, and voltage VcapA across DC capacitor 29. Conversion unit 110 outputs, to DC control unit 120, DC voltage VdcA, and Idc flowing through line 50P between first positive DC terminal 2A and second positive DC terminal 2B. Conversion unit 110 outputs, to AC control unit 130, each phase AC current Jac, each phase AC voltage Vs (VsuA, VsvA, VswA), and voltage average VcapA across DC capacitor 29.

DC control unit 120 controls DC voltage and DC current. DC control unit 120 outputs a command value Kdc* to positive arm command value computing unit 140 and negative arm command value computing unit 141.

AC control unit 130 controls AC voltage and AC current. AC control unit 130 outputs a command value Vac+* to positive arm command value computing unit 140, and outputs a command value Vac−* to negative arm command value computing unit 141.

Positive arm command value computing unit 140 calculates a positive arm voltage command value V+*, based on command value Kdc* and command value Vac+*.

Negative arm command value computing unit 141 calculates a negative arm voltage command value V−*, based on command value Kdc* and command value Vac−*.

Positive cell individual control unit 155 calculates a voltage command value Vcell+* of each positive transducer cell 10A, based on positive arm voltage command value V+*.

Negative cell individual control unit 156 calculates a voltage command value Vcell−* of each negative transducer cell 10A, based on negative arm voltage command value V−*.

Positive PWM circuit 160 generates a gate signal for PWM control of each transducer cell 10A in positive arms 5UA, 5VA, 5WA, based on voltage command value Vcell+* of each positive transducer cell 10A.

Negative PWM circuit 161 generates a gate signal for PWM control of each transducer cell 10A in negative arms 6UA, 6VA, 6WA, based on voltage command value Vcell−* of each negative transducer cell 10A.

Semiconductor switching elements 21s, 22s in transducer cell 10A are control driven by the generated gate signal, thereby controlling the output voltage of first power converter 1A to a desired value.

Next, a method for starting up the power conversion system will be described. In particular, description will be given with respect to a method of computation of DC voltage command values VdcA*, VdcB* which are input to DC control unit 120 which controls DC voltages VdcA, VdcB of first power converter 1A and second power converter 1B.

Figure 6:
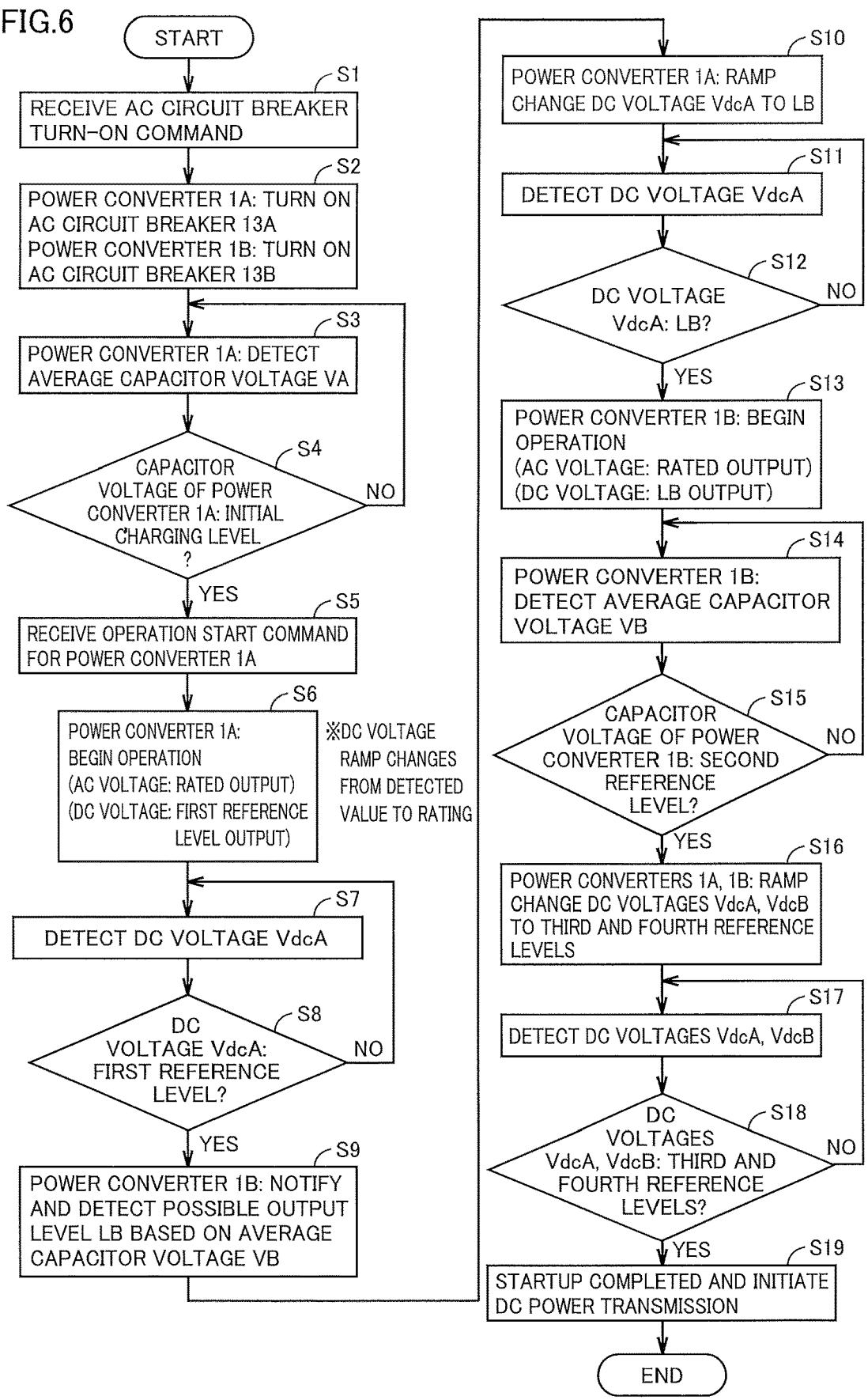
FIG. 6 is a flowchart representing a procedure for startup of the power conversion system according to Embodiment 1.

FIG. 6 is a flowchart representing a procedure for startup of the power conversion system according to Embodiment 1.

Figure 7:
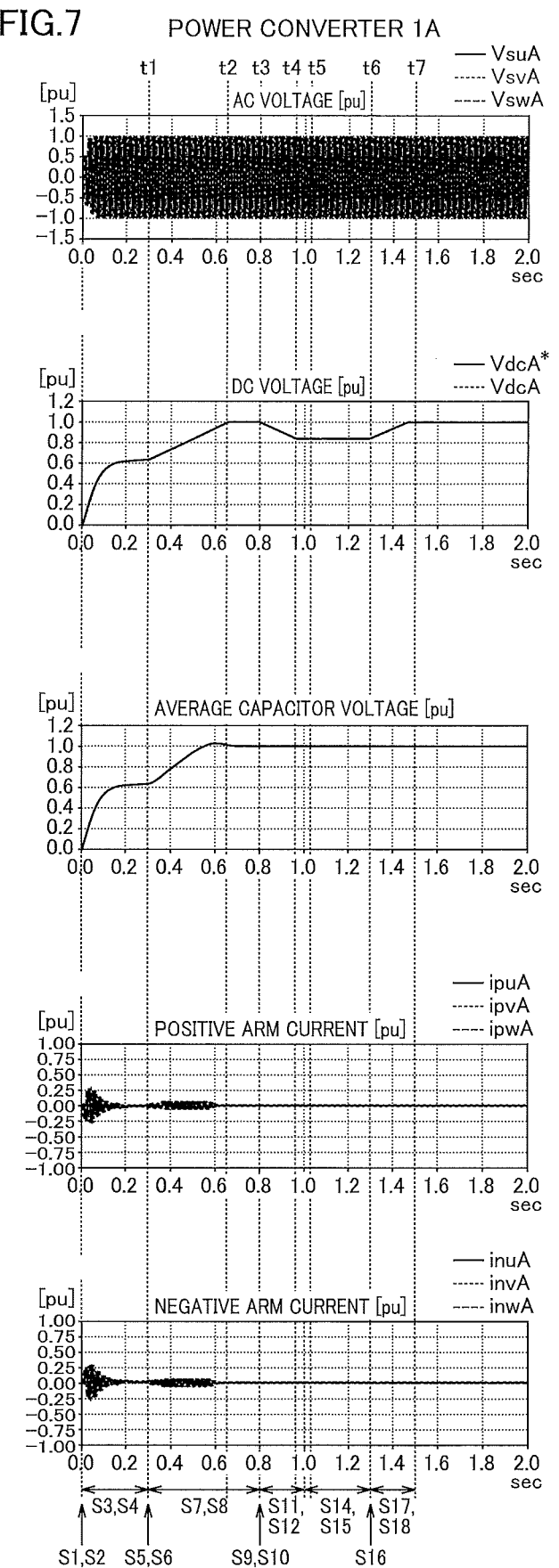
FIG. 7 shows diagrams representing: alternating-current (AC) voltages VsuA, VsvA, VswA at a first power converter 1A versus time; DC voltage VdcA between a first positive direct-current (DC) terminal 2A and a first negative DC terminal 3A and its command value VdcA* versus time; an average of voltages of DC capacitors 29 included in first power converter 1A; positive arm currents ipuA, ipvA, ipwA of first power converter 1A versus time; and negative arm currents inuA, invA, inwA of first power converter 1A versus time.
Figure 8:
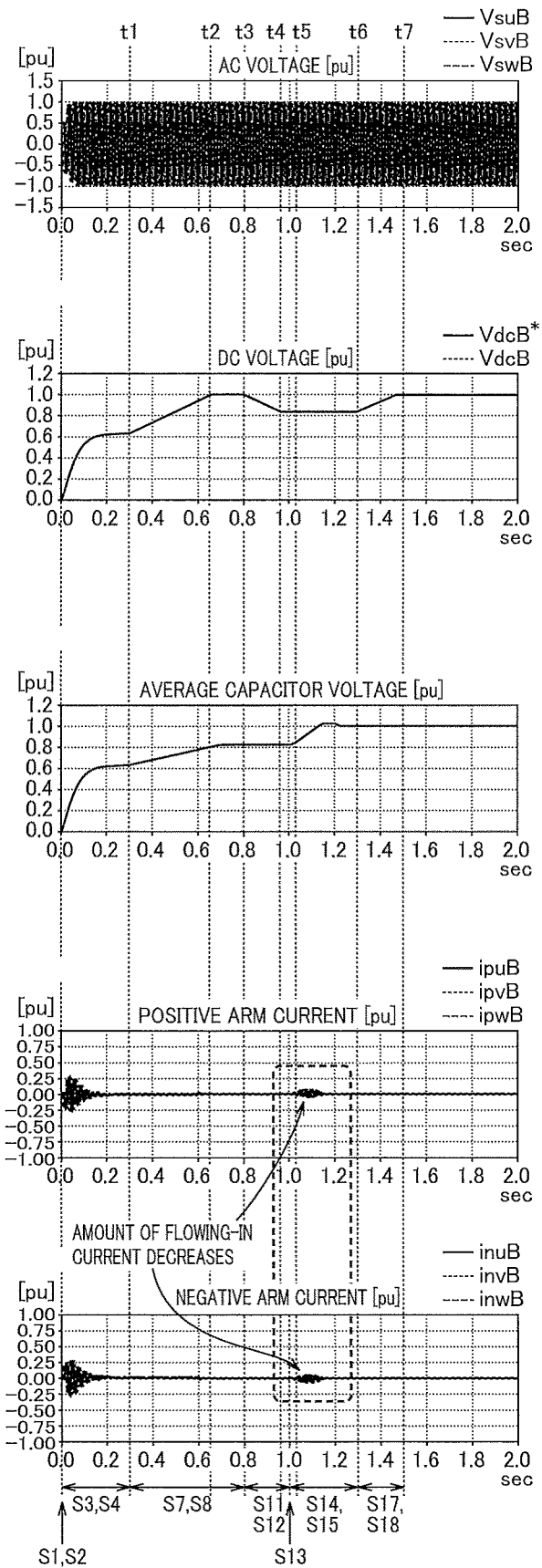
FIG. 8 shows diagrams representing: AC voltages VsuB, VsvB, VswB of a second power converter 1B versus time; DC voltage VdcB between a second positive DC terminal 2B and a second negative DC terminal 3B and its command value VdcB* versus time; an average of voltages of DC capacitors 29 included in second power converter 1B versus time; positive arm currents ipuB, ipvB, ipwB of second power converter 1B versus time; and negative arm currents inuB, invB, inwB of second power converter 1B versus time.

FIG. 7 shows diagrams representing: AC voltages VsuA, VsvA, VswA in first power converter 1A versus time; DC voltage VdcA between first positive DC terminal 2A and first negative DC terminal 3A and its command value VdcA* versus time; an average of voltages of DC capacitors 29 included in first power converter 1A versus time; positive arm currents ipuA, ipvA, ipwA of first power converter 1A versus time; and negative arm currents inuA, invA, inwA of first power converter 1A versus time. FIG. 8 shows diagrams representing: AC voltages VsuB, VsvB, VswB in second power converter 1B versus time; DC voltage VdcB between second positive DC terminal 2B and second negative DC terminal 3B and its command value VdcB* versus time; an average of voltages of DC capacitors 29 included in second power converter 1B versus time; positive arm currents ipuB, ipvB, ipwB of second power converter 1B versus time; and negative arm currents inuB, invB, inwB of second power converter 1B versus time. In FIGS. 7 and 8, pu represents a unit voltage or a unit current.

The difference between DC voltage VdcA and DC voltage VdcB varies, depending on impedances between first positive DC terminal 2A and first negative DC terminal 3A and between second positive DC terminal 2B and second negative DC terminal 3B. If the impedances are close to zero, DC voltage VdcA and DC voltage VdcB are almost equal.

Referring to FIGS. 6, 7, and 8, at step S1, first control device 100A and second control device 100B for first power converter 1A and second power converter 1B receive an AC circuit breaker turn-on command sent from main control device 200.

At step S2, first control device 100A and second control device 100B for first power converter 1A and second power converter 1B, having received the AC circuit breaker turn-on command, turn on AC circuit breakers 13A, 13B. As a result of this, first power converter 1A and second power converter 1B are interconnected to AC systems 9A, 9B, charging of DC capacitors 29 of transducer cells 10A, 10B in first power converter 1A and second power converter 1B is started by a diode rectifier operation, and DC voltages VdcA, VdcB increase. The diode rectifier operation is an operation in which a current flows through only diodes 21d, 22d which are connected in anti-parallel with semiconductor switching elements 21s, 22s in first power converter 1A, second power converter 1B while semiconductor switching elements 21s, 22s in first power converter 1A, second power converter 1B are off.

At step S3, first control device 100A obtains voltages of DC capacitors 29 included in all the transducer cells 10A of first power converter 1A, and calculates an average (hereinafter, an average voltage VA) of the voltages. The average is used because the voltages of DC capacitors 29 included in all the transducer cells 10A are approximately the same value and a small amount of error is negligible.

At step S4, first control device 100A determines whether the initial charging of DC capacitors 29 included in first power converter 1A has completed, based on whether average voltage VA has reached an initial charging level VIF or whether an average voltage VA has been greater than or equal to initial charging level VIF for a few consecutive cycles. For example, specifications [pu] of initial charging level VIF can be a value predetermined according to the following Equation (1), where $V_1$ [V] indicates a first power converter 1A side rated line AC voltage, Ncell indicates the number of transducer cells 10A per arm, and Vmx [V] indicates a rated capacitor voltage of transducer cell 10A.

[MATH 1]

$$VIF = \frac{\sqrt{2} V_l}{Ncell} \frac{1}{Vmx} \quad (1)$$

The completion of the initial charging of DC capacitors 29 included in transducer cells 10A of first power converter 1A is determined because a drive device not shown in FIG. 3 uses the energy generated by the DC capacitors 29 included in transducer cells 10A to drive semiconductor switching elements 21s, 22s included in transducer cells 10A. Semiconductor switching elements 21s, 22s included in transducer cell 10A are not driven until the charging voltage of DC capacitors 29 has reached the initial charging voltage. In other words, semiconductor switching elements 21s, 22s can be driven once the completion of the initial charging is determined.

The initial charging of DC capacitors 29 included in second power converter 1B may be completed or incomplete. Thus, the completion of the initial charging of DC capacitors 29 included in second power converter 1B is not determined.

If the initial charging is determined to be incomplete at step S4 (S4: NO), the process returns to step S3, and first control device 100A repeats the process of determining the completion of the initial charging. If the initial charging of DC capacitors 29 is determined to be completed at step S4 (S4: YES), the process proceeds to step S5. As shown in the third row of FIG. 7, S4 is determined as YES at time t1.

At step S5, first control device 100A notifies first control device 100A for first power converter 1A of an operation start command.

At step S6, first control device 100A for first power converter 1A, having received the operation start command, generates voltage command values Vcell+*, Vcell−* for outputting an AC voltage to AC terminals 7UA, 7VA, 7WA and a first reference level to first DC terminals 2A, 3A. First control device 100A performs a PWM control on semiconductor switching elements 21s, 22s, based on voltage command values Vcell+*, Vcell−*. At this time, DC capacitors 29 are charged with power from AC system 9A simultaneously. The control command value for the average of the voltages of DC capacitors 29 versus time is configured as a ramp function RC having a constant rate of increase, and command value VdcA* for DC voltage VdcA between first positive DC terminal 2A and first negative DC terminal 3A is configured as a ramp function RD having a constant rate of increase, the ramp function RD being depending on ramp function RC. By adjusting the AC voltage to be output to AC terminals 7UA, 7VA, 7WA so that the average of the voltages of DC capacitors 29 follows the control command value for the average of voltages, and passing a charging current from AC system 9A to DC capacitors 29, thereby raising the average of voltages of DC capacitors 29 at a constant rate of increase and raising DC voltage VdcA at a constant rate of increase (see times t1 to t2 in FIGS. 7 and 8). DC capacitors 29 of transducer cells 10B included in second power converter 1B are also charged with power from the DC system to constant levels with an increase of DC voltage VdcA. Here, the average of the voltages of DC capacitors 29 and DC voltage VdcA are raised at a constant rate of increase because DC capacitor 29 rapidly receives energy from AC system 9A if they are raised rapidly, causing variations in voltage of AC system 9A. A value that does not cause variations in voltage of AC system 9A may be determined by a simulation or the like and set as the rate of increase.

At step S7, first control device 100A obtains the magnitude of DC voltage VdcA by measurement or computation.

At step S8, first control device 100A determines whether the raising of DC voltage VdcA to the first reference level has completed, based on the magnitude of DC voltage VdcA, specifically, based on whether DC voltage VdcA has reached the first reference level or whether DC voltage VdcA has been greater than or equal to the first reference level for a few consecutive cycles. If the raising of DC voltage VdcA to the first reference level is determined to be incomplete (S8: NO), the process returns to step S7, and first control device 100A repeats the process of determining whether the raising has completed. If the raising of DC voltage VdcA to the first reference level is determined to be completed (S8: YES), the process proceeds to step S9. DC voltage VdcA is raised to the first reference level at steps S7 and S8 in order to charge DC capacitors 29 included in second power converter 1B to a constant level. If the amount of charge in DC capacitors 29 included in second power converter 1B is low, an increased amount of voltage is reduced at the following step S9, which may cause first power converter 1A to overmodulate. The first reference level can be the rated voltage for first power converter 1A, or a voltage that is higher or smaller than the rated voltage by a few percentages.

At step S9, main control device 200 receives, from second control device 100B for second power converter 1B, a signal representing a level LB of the DC voltage that can be output from second power converter 1B, as information representing the status of second power converter 1B. For example, level LB of the DC voltage can be determined by the following Equation (2), where average voltage VB indicates an average of voltages of DC capacitors 29 included in all the transducer cells 10B of second power converter 1B, and MD indicates a DC modulation rate. When MD is set to 0.5, LB is equal to average voltage VB.

$$LB = VB \times MD \times 2 \quad (2)$$

At step S10, first control device 100A for first power converter 1A receives level LB of the DC voltage from main control device 200. First control device 100A reduces DC voltage VdcA to LB at a constant rate of reduction. Command value VdcA* for DC voltage VdcA between first positive DC terminal 2A and first negative DC terminal 3A is configured as a ramp function having a constant rate of reduction, thereby causing DC voltage VdcA to fall at the constant rate of reduction (see times t3 to t4 in the second row of FIG. 7 and the second row of FIG. 8).

At step S11, first control device 100A obtains the magnitude of DC voltage VdcA by measurement or computation.

At step S12, first control device 100A determines whether the magnitude of VdcA has changed to level LB of the DC voltage that can be output from second power converter 1B obtained at step S9, based on whether the magnitude of DC voltage VdcA has reached level LB of the DC voltage or whether the magnitude of DC voltage VdcA has been at level LB of the DC voltage for a few consecutive cycles.

If the magnitude of DC voltage VdcA is determined as not having changed to level LB of the DC voltage that can be output from second power converter 111 (S12: NO), the process returns to step S11, and first control device 100A repeats the process of determining the completion of the change. If the magnitude of DC voltage VdcA is determined as having changed to level LB of the DC voltage that can be output from second power converter 1B (S12: YES), the process proceeds to step S13. This can reduce the potential difference between DC voltage VdcA and DC voltage VdcB, thereby allowing for reduction of inrush current from first power converter 1A to second power converter 1B.

At step S13, second control device 100B for second power converter 1B receives an operation start command sent from main control device 200. Second control device 100B generates voltage command values Vcell+*, Vcell−* for outputting AC voltage to AC terminals 7UB, 7VB, 7WB and outputting, to second DC terminals 2B, 3B, level LB of the DC voltage that can be output from second power converter 1B and transmitted at step S9, and performs a PWM control of semiconductor switching elements 21s, 22s. At this time, DC capacitors 29 in second power converter 1B are simultaneously charged with power from AC system 9B. First control device 100A maintains the voltages of first DC terminals 2A, 3A at level LB of the DC voltage that can be output from second power converter 1B. This increases the voltages of DC capacitors 29 in second power converter 1B at a constant rate of change. DC voltage VdcB is raised to LB, not to the rating, for the sake of stable operation. If DC voltage VdcB is raised to the rating, a current flows through second power converter 1B due to the voltage difference between DC voltage VdcA and DC voltage VdcB, which needs to be prevented.

At step S14, second control device 100B obtains an average of voltages (hereinafter, average voltage VB) of DC capacitors 29 included in all the transducer cells 10B of second power converter 1B by measurement or computation.

At step S15, second control device 100B determines whether charging of DC capacitors 29 included in all the transducer cells 10B of second power converter 1B to a second reference level has completed, based on whether average voltage VB has reached the second reference level or whether average voltage VB has been at the second reference level for a few consecutive cycles. If charging of DC capacitors 29 to the second reference level is determined to be incomplete (S15: NO), the process returns to step S14, and second control device 100B repeats the operation of determining the completion of the charging. If charging of DC capacitors 29 to the second reference level is determined to be completed (S15: YES), the process proceeds to step S16. The second reference level can be the rated voltage for DC capacitors 29, or a voltage higher or smaller than the rated voltage by a few percentages.

At step S16, first control device 100A receives, from second control device 100B, information notifying that charging of DC capacitors 29 included in all the transducer cells 10B of second power converter 1B to the second reference level has completed, as information representing the status of second power converter 1B. First control device 100A raises command value VdcA* for DC voltage VdcA to a third reference level at a constant rate of change. Second control device 100B raises command value VdcB* for DC voltage VdcB to a fourth reference level at a constant rate of change. The third reference level can be the rated voltage for first power converter 1A, or a voltage higher or smaller than the rated voltage by a few percentages. The fourth reference level can be the rated voltage for second power converter 1B, or a voltage higher or smaller than the rated voltage by a few percentages. Note that, preferably, the third reference level and the fourth reference level are the same level for the prevention of inrush current caused by the potential difference between DC voltages VdcA and VdcB.

At step S17, first control device 100A obtains the magnitudes of DC voltages VdcA, VdcB by measurement or computation.

At step S18, first control device 100A and second control device 100B determine whether the raising of DC voltages VdcA, VdcB to the third reference level and the fourth reference level has completed, based on whether the magnitudes of DC voltages VdcA, VdcB have reached the third reference level and the fourth reference level or whether the magnitudes of DC voltages VdcA, VdcB have been at the third reference level and the fourth reference level for a few consecutive cycles. At step S18, if the raising of DC voltages VdcA, VdcB to the third reference level and the fourth reference level is determined to be incomplete (S18: NO), the process returns to step S17, and first control device 100A and second control device 100B repeat the processes of determining the completions of the raising. If the raising of DC voltages VdcA, VdcB to the third reference level and the fourth reference level is determined to be completed (S18: YES), the process proceeds to step S19.

At step S19, the startup is completed and the process transitions to a DC power transmission initiation operation. For example, first power converter 1A converts an AC power into a DC power, and second power converter 1B converts a DC power into an AC power, thereby transmitting the power from AC system 9A to AC system 9B.

Embodiment 2

Figures 9, 10:
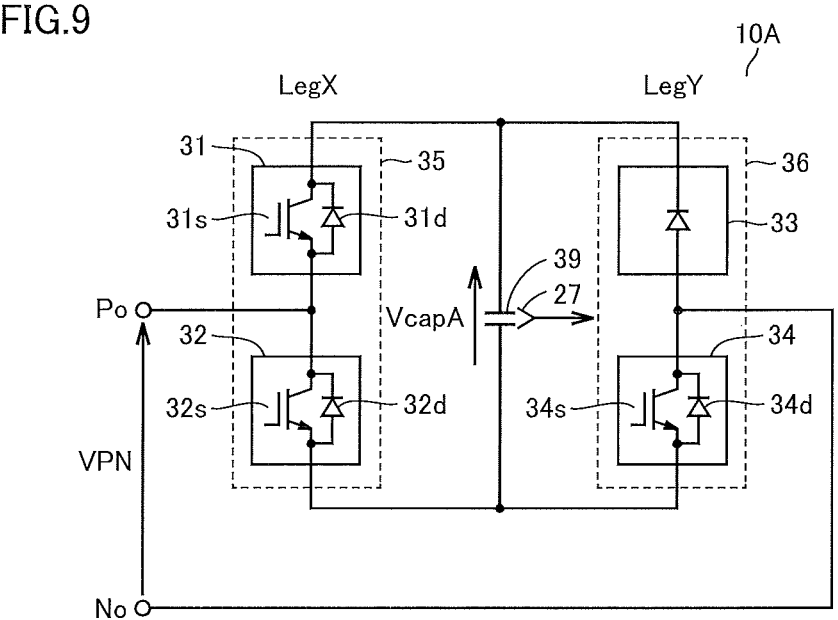
FIG. 9 is a diagram representing a configuration of a transducer cell 10A according to Embodiment 2.
FIG. 10 is a diagram representing a relationship between modes and operations of transducer cell 10A according to Embodiment 2.

FIG. 9 is a diagram representing a configuration of a transducer cell 10A according to Embodiment 2. A transducer cell 10B has the same configuration as transducer cell 10A.

Transducer cell 10A includes a series body 35 and a series body 36, and a DC capacitor 39 which are connected in parallel. In the following description, series body 35 may be referred to as LeX, and series body 36 may be referred to as LegY.

DC capacitor 39 smoothes DC voltage.

Series body 35 includes a switch 31 and a switch 32 which are connected in series.

Switch 31 includes a semiconductor switching element 31s and a diode 31d connected in anti-parallel with semiconductor switching element 31s.

Switch 32 includes a semiconductor switching element 32s and a diode 32d connected in anti-parallel with semiconductor switching element 32s.

Series body 36 includes a diode 33 and a switch 34 which are connected in series.

Switch 34 includes a semiconductor switching element 34s and a diode 34d connected in anti-parallel with semiconductor switching element 34s.

Self turn-off elements, such as IGBT or GCT, are used as semiconductor switching elements 31s, 32s, 34s.

In transducer cell 10A according to Embodiment 2, semiconductor switching elements 31s, 32s, 34s turn on or off, thereby causing a positive voltage having the same polarity and substantially equal in magnitude to the voltage of DC capacitor 39 or zero voltage to be output from a terminal Po, which is a point of connection between semiconductor switching elements 31s, 32s, and terminal No, which is a point of connection between diode 33 and semiconductor switching element 34s.

FIG. 10 is a diagram representing modes and operations of transducer cell 10A according to Embodiment 2.

In mode 1, semiconductor switching element 31s is on, semiconductor switching element 32s is off, and semiconductor switching element 34s is on. At this time, a voltage between terminals Po, No is, generally, a voltage VcapA across DC capacitor 39.

In mode 2, semiconductor switching element 31s is off, semiconductor switching element 32s is on, and semiconductor switching element 34s is on. At this time, a voltage between terminals Po, No is generally zero voltage (0).

While series body 36 (LegY) includes a diode and a switch, it should be noted that series body 35 (LegX) may include a diode and a switch.

Embodiment 3

Figures 11, 12:
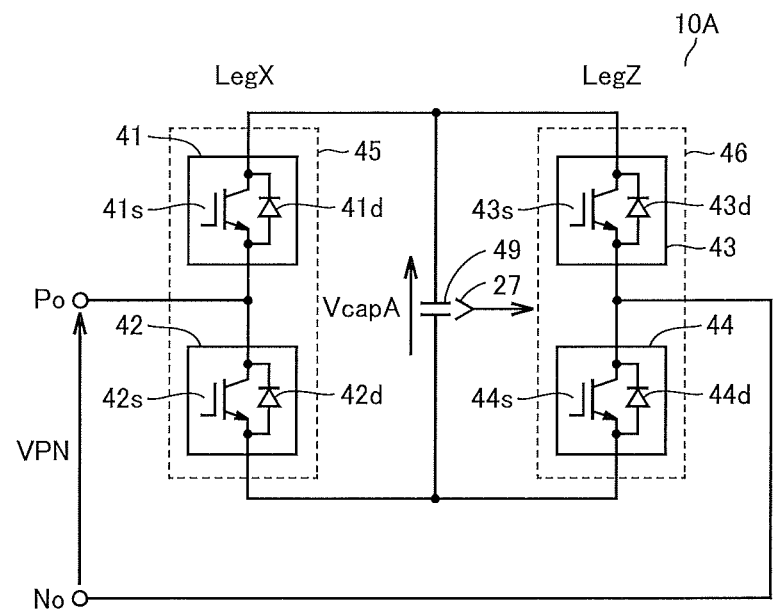
FIG. 11 is a diagram representing a configuration example of a transducer cell 10A according to Embodiment 3.
FIG. 12 is a diagram representing a relationship between modes and operations of transducer cell 10A according to Embodiment 3.

FIG. 11 is a diagram representing a configuration example of a transducer cell 10A according to Embodiment 3. A transducer cell 10B has the same configuration as transducer cell 10A.

Transducer cell 10A has a full-bridge configuration.

Transducer cell 10A includes a series body 45, a series body 46, and a DC capacitor 49 which are connected in parallel. In the following description, series body 45 may be referred to as LegX, and series body 46 may be referred to as LegZ.

DC capacitor 49 smoothes DC voltage.

Series body 45 includes a switch 41 and a switch 42 which are connected in series. Switch 41 includes a semiconductor switching element 41s and a diode 41d connected in anti-parallel with semiconductor switching element 41s. Switch 42 includes a semiconductor switching element 42s and a diode 42d connected in anti-parallel with semiconductor switching element 42s.

Series body 46 includes a switch 43 and a switch 44 which are connected in series. Switch 43 includes a semiconductor switching element 43s and a diode 43d connected in anti-parallel with semiconductor switching element 43s. Switch 44 includes a semiconductor switching element 44s and a diode 44d connected in anti-parallel with semiconductor switching element 44s.

Self turn-off elements, such as IGBT or GCT, are used as semiconductor switching elements 41s, 42s, 43s, 44s.

In transducer cell 10A according to Embodiment 3, semiconductor switching elements 41s, 42s, 43s, 44s turn on or off, thereby causing a positive voltage having the same polarity as the voltage across DC capacitor 49, a negative voltage having an opposite polarity to the voltage across DC capacitor 49, or zero voltage to be output from a terminal Po and a terminal No, the terminal Po being a point of connection between semiconductor switching elements 41s, 42s, the terminal No being a point of connection between semiconductor switching element 43s, 44s.

FIG. 12 is a diagram representing modes and operations of transducer cell 10A according to Embodiment 3.

In mode 1, semiconductor switching element 41s is on, semiconductor switching element 42s is off, semiconductor switching element 43s is off, and semiconductor switching element 44s is on. At this time, a voltage between terminals Po, No is, generally, a voltage VcapA across DC capacitor 49.

In mode 2, semiconductor switching element 41s is off, semiconductor switching element 42s is on, semiconductor switching element 43s is on, and semiconductor switching element 44s is off. At this time, a voltage between terminals Po, No is, generally, a voltage (−VcapA) across DC capacitor 49.

In mode 3, semiconductor switching element 41s is on, semiconductor switching element 42s is off, semiconductor switching element 43s is on, and semiconductor switching element 44s is off. At this time, a voltage between terminals Po, No is, generally, zero voltage (0).

In mode 4, semiconductor switching element 41s is off, semiconductor switching element 42s is on, semiconductor switching element 43s is off, and semiconductor switching element 44s is on. At this time, a voltage between terminals Po, No is generally zero voltage (0).

Embodiment 4

Figure 13:
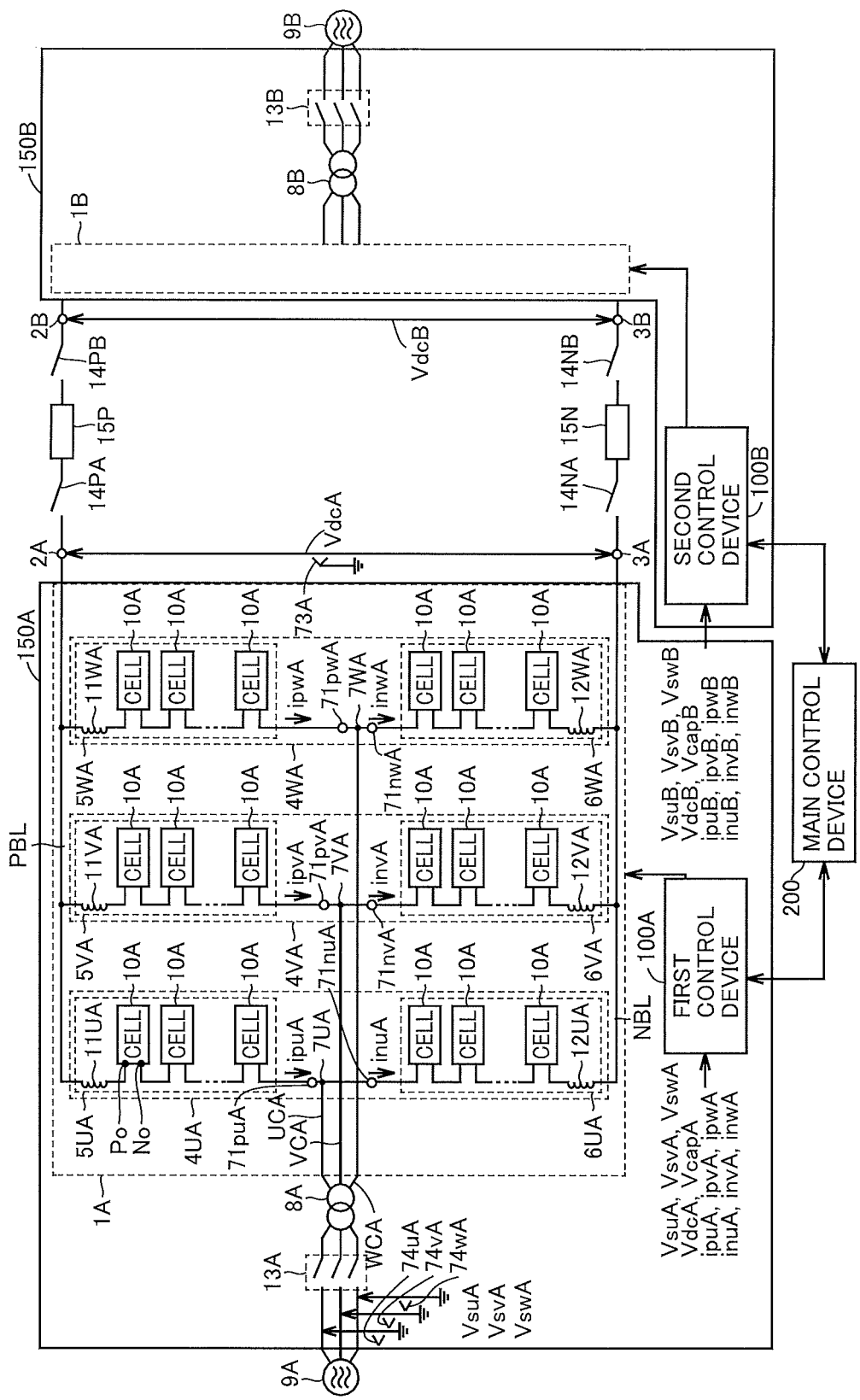
FIG. 13 is a schematic configuration diagram of a power conversion system according to Embodiment 4.

FIG. 13 is a schematic configuration diagram of a power conversion system according to Embodiment 4.

Components included the power conversion system that are the same as those according to Embodiment 1 will not be described.

As shown in FIG. 13, a first positive DC terminal 2A, connected to a first power converter 1A, is connected to a DC transmission line 15P which is a DC system, via a DC circuit breaker 14PA. A first negative DC terminal 3A, connected to first power converter 1A, is connected to a DC transmission line 15N which is a DC system, via a DC circuit breaker 14NA.

A second positive DC terminal 2B, connected to a second power converter 1B, is connected to DC transmission line 15P via a DC circuit breaker 14PB. A second negative DC terminal 3B, connected to second power converter 1B, is connected to DC transmission line 15N via a DC circuit breaker 14NB.

Next, a method for starting up the power conversion system according to Embodiment 4 will be described.

Figure 14:
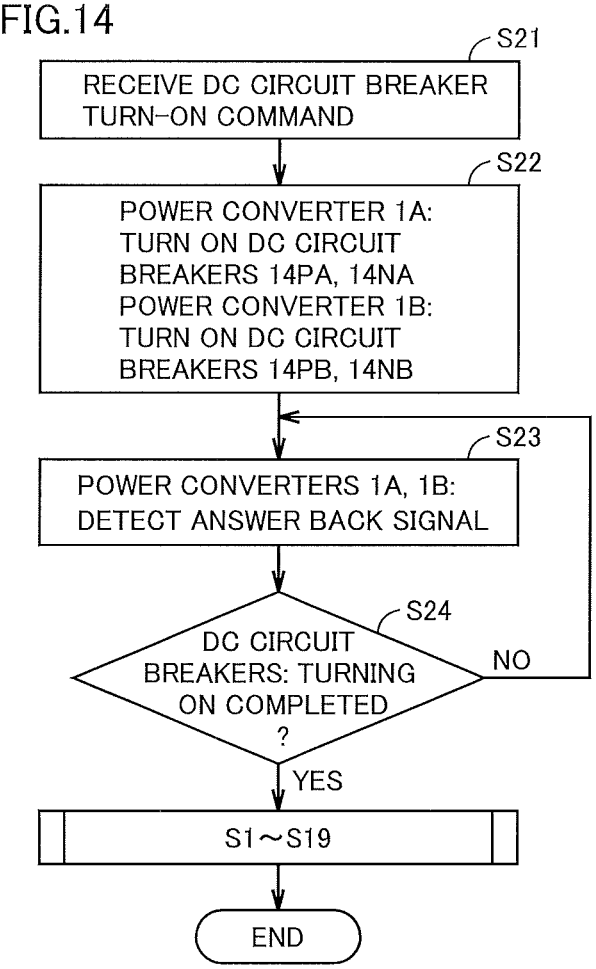
FIG. 14 is a flowchart representing a procedure for startup of the power conversion system according to Embodiment 4.

FIG. 14 is a flowchart representing a procedure for startup of the power conversion system according to Embodiment 4.

At step S21, a first control device 100A and second control device 100B for first power converter 1A and second power converter 1B receive a DC circuit breaker turn-on command sent from a main control device 200.

At step S22, first control device 100A and second control device 100B for first power converter 1A and second power converter 1B, having received the DC circuit breaker turn-on command, turn on DC circuit breakers 14PA, 14NA, 14PB, 14NB.

This connects first power converter 1A and second power converter 1B through DC transmission lines 15P, 15N.

At step S23, first control device 100A and second control device 100B detect whether an answer back signal is sent, the answer back signal notifying that DC circuit breakers 14PA, 14NA, 14PB, 14N are turned on.

At step S24, based on the answer back signal, it is determined whether all the DC circuit breakers 14PA, 14NA, 14PB, 14NB are turned on. If the turning on of all the DC circuit breakers 14PA, 14NA, 14PB, 14NB is determined to be incomplete at step S23, the process returns to step S22, and first control device 100A and second control device 100B repeat, at regular intervals, the determination of the completion of turning on of DC circuit breakers 14PA, 14NA, 14PB, 14NB. At step S23, if the turning on of all the DC circuit breakers 14PA, 14NA, 14PB is determined to be completed, the process proceeds to steps S1 to S19 in FIG. 6.

According to the present embodiment, inrush current that flows into the power converter upon startup can be reduced also in a power conversion system which includes a DC circuit breaker 14.

Embodiment 5

Figure 15:
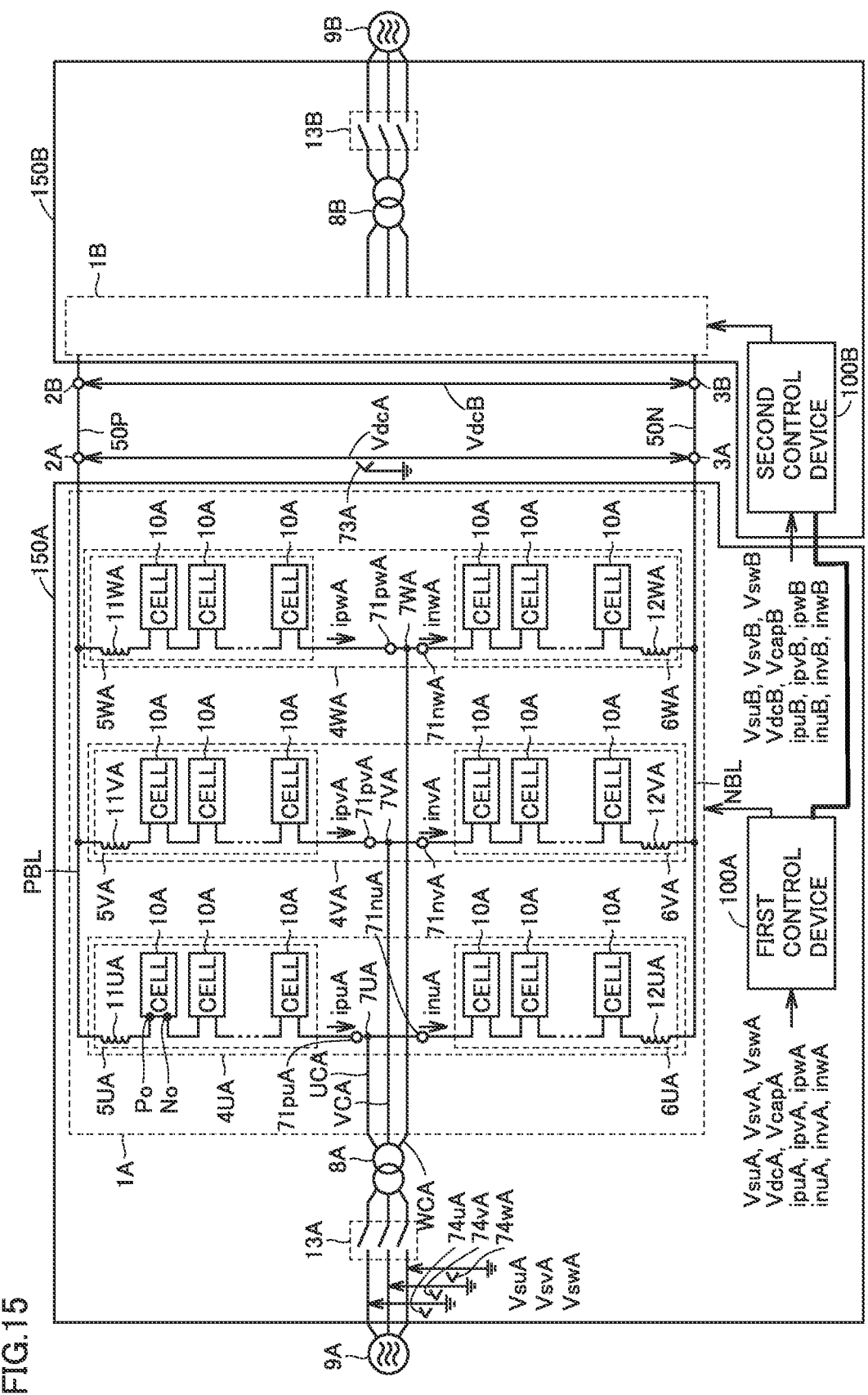
FIG. 15 is a schematic configuration diagram of a power conversion system according to Embodiment 5.

FIG. 15 is a schematic configuration diagram of a power conversion system according to Embodiment 5.

Among components included in the power conversion system, the same components as those according to Embodiment 4 will not be described.

As shown in FIG. 15, first control device 100A and second control device 100B directly communicate with each other, bypassing main control device 200.

Accordingly, the operations at steps S6, S13, etc. in the flowchart of FIG. 6 are initiated by first control device 100A and second control device 100B, without a command from the precedence main control device 200.

According to the present embodiment, inrush current that flows into the power converter upon startup can be reduced, without requiring the precedence main control device 200.

Embodiment 6

Figure 16:
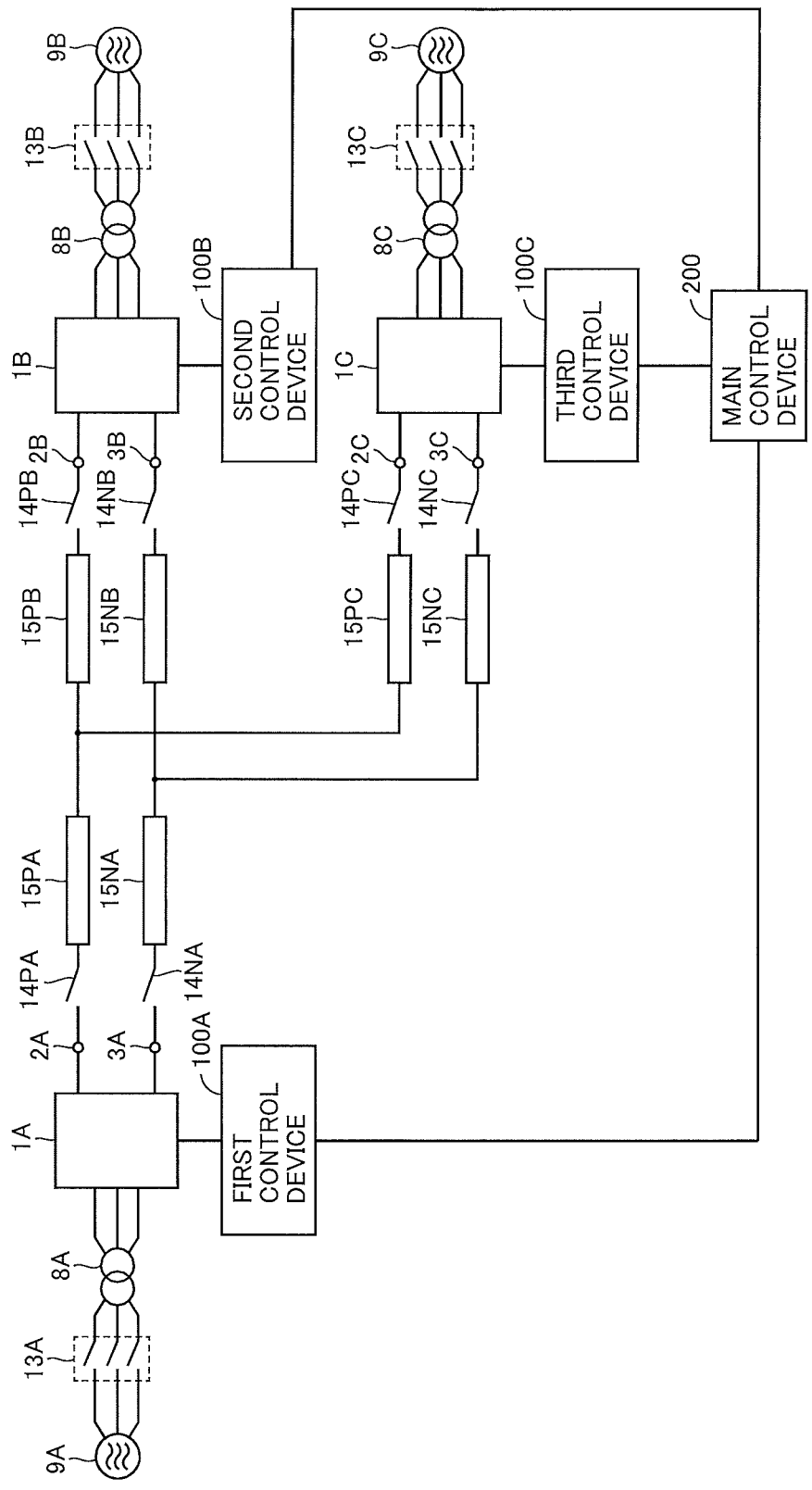
FIG. 16 is a schematic configuration diagram of a power conversion system according to Embodiment 6.

FIG. 16 is a schematic configuration diagram of a power conversion system according to Embodiment 6. The power conversion system is a three-terminal HVDC (High Voltage Direct Current) system. The same parts as those according to Embodiment 1 will not be described.

A method for starting up the three-terminal HVDC system will be described from charging of capacitors with power from an AC system to a start of transmission of power.

A first power converter 1A connects to an AC system 9A. First power converter 1A, connected to first DC terminals 2A, 3A, is connected, via DC circuit breakers 14PA, 14NA, to DC transmission lines 15PA, 15NA which are DC systems. A second power converter 1B connects to an AC system 9B. Second power converter 1B, connected to second DC terminals 2B, 3B, is connected, via DC circuit breakers 14PB, 14NB, to DC transmission lines 15PB, 15NB which are DC systems. A third power converter 1C connects to an AC system 9C. Third power converter 1C, connected to third DC terminals 2C, 3C, is connected, via DC circuit breakers 14PC, 14NC, to DC transmission lines 15PC, 15NC which are DC systems. DC transmission line 15PA, DC transmission line 15PB, and DC transmission line 15PC are connected. DC transmission line 15NA, DC transmission line 15NB, and DC transmission line 15NC are connected.

Figure 17:
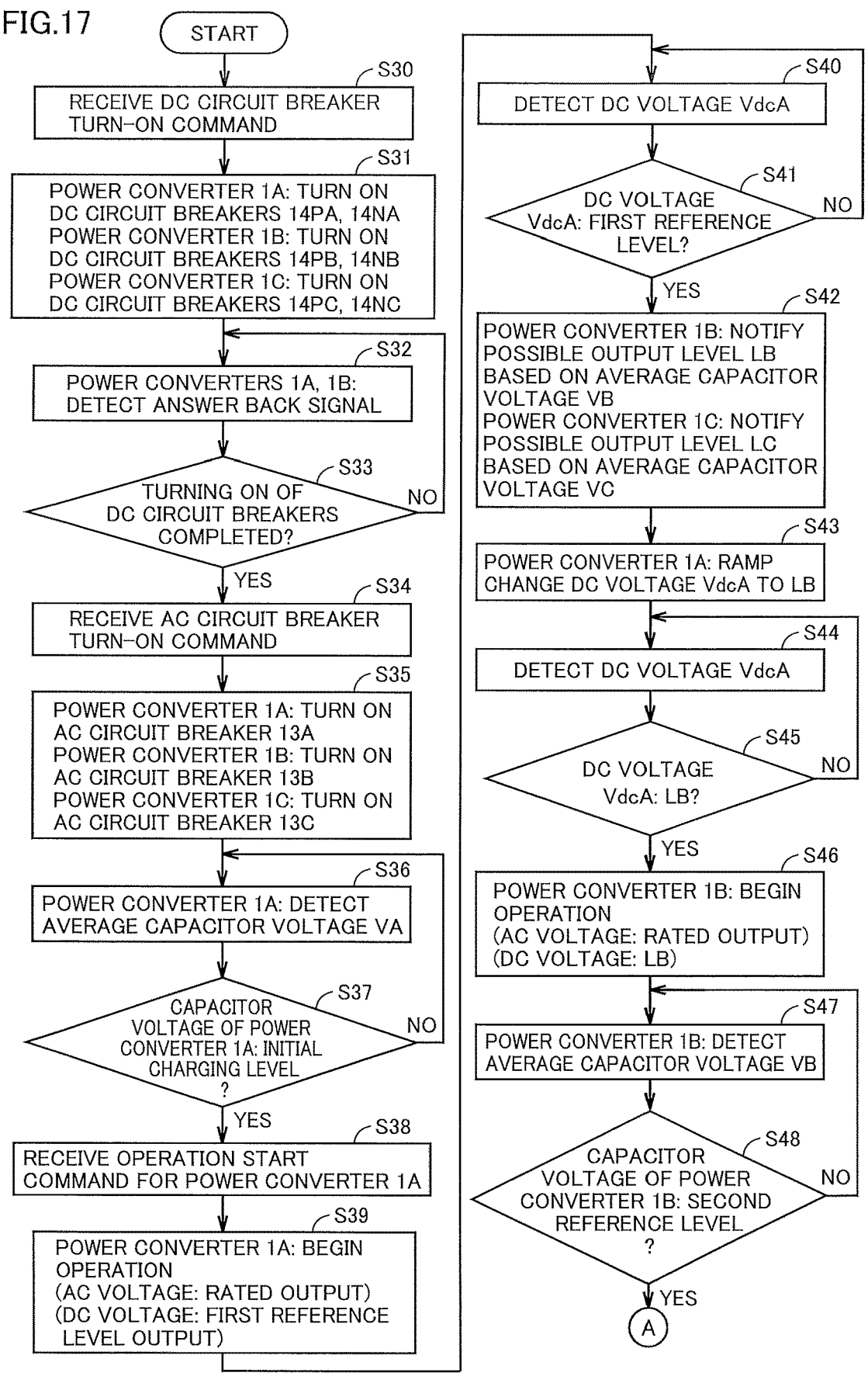
FIG. 17 is a flowchart representing a procedure for startup of the power conversion system according to Embodiment 6.
Figure 18:
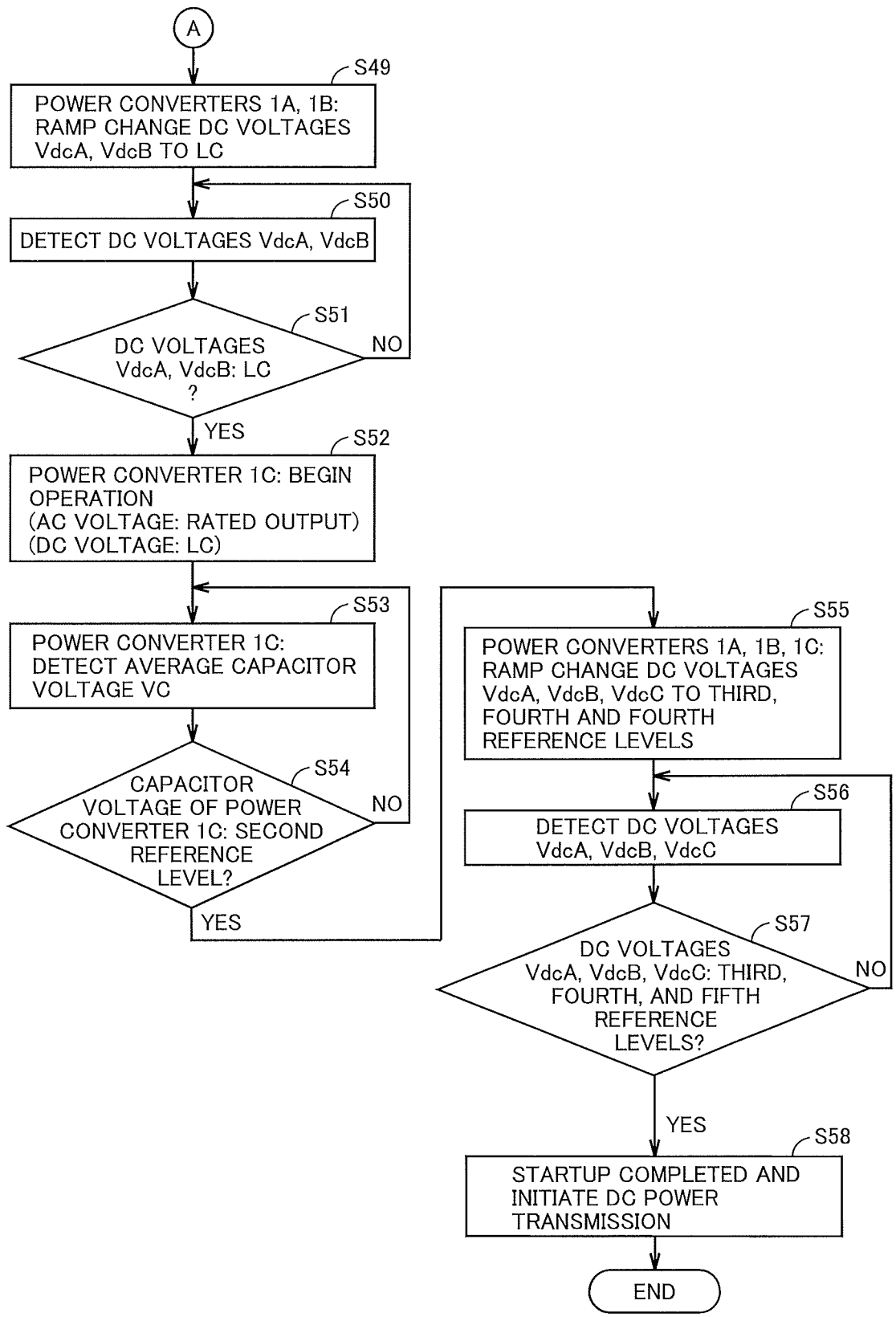
FIG. 18 is a flowchart representing a procedure for startup of the power conversion system according to Embodiment 6.

FIGS. 17 and 18 are flowcharts representing a procedure for startup of the power conversion system according to Embodiment 6.

At step S30, first power converter 1A, second power converter 1B, a first control device 100A for third power converter 1C, a second control device 100B, and third control device 100C receive a DC circuit breaker turn-on command sent from main control device 200.

At step S31, first control device 100A, second control device 100B, and third control device 100C for first power converter 1A, second power converter 1B, and third power converter 1C, having received the DC circuit breaker turn-on command, turn on DC circuit breakers 14PA, 14NA, 14PB, 14NB, 14PC, 14NC. This connects first power converter 1A and second power converter 1B via DC transmission lines 15PA, 15PB, 15NA, 15NB. First power converter 1A and third power converter 1C are connected via DC transmission lines 15PA, 15PC, 15NA, 15NC. Second power converter 1B and third power converter 1C are connected via DC transmission lines 15PB, 15PC, 15NB, 15NC.

At step S32, first control device 100A, second control device 100B, and third control device 100C detect whether an answer back signal has been sent, the answer back signal notifying that DC circuit breakers 14PA, 14NA, 14PB, 14NB, 14PC, 14N are turned on.

At step S33, based on the answer back signal, first control device 100A, second control device 100B, and third control device 100C determine whether all the DC circuit breakers 14PA, 14NA, 14PB, 14NB, 14PC, 14NC are turned on. It the turning on of all the DC circuit breakers 14PA, 14NA, 14PB, 14NB, 14PC, 14NC is determined to be incomplete at step S33, the process returns to step S32, and first control device 100A, second control device 100B, and third control device 100C repeat, at regular intervals, the process of determining of the completion of turning on of DC circuit breakers 14PA, 14NA, 14PB, 14NB, 14PC, 14NC.

If the turning on of all the DC circuit breakers 14PA, 14NA, 14PB, 14NB, 14PC, 14NC is determined to be completed at step S33, the process proceeds to step S34.

At step S34, first control device 100A, second control device 100B, and third control device 100C for first power converter 1A, second power converter 1B, and third power converter 1C receive an AC circuit breaker turn-on command sent from main control device 200.

At step S35, first control device 100A, second control device 100B, and third control device 100C for first power converter 1A, second power converter 1B, and third power converter 1C, having received the AC circuit breaker turn-on command, turn on AC circuit breakers 13A, 13B, 13C. As a result of this, first power converter 1A, second power converter 1B, and third power converter 1C are interconnected to AC systems 9A, 9B, 9C; DC voltages VdcA, VdcB, VdcC is increased by a diode rectifier operation; and charging of DC capacitors 29 included in transducer cells 10A, 10B, 10C of first power converter 1A, second power converter 1B, and third power converter 1C is started.

At step S36, first control device 100A obtains voltages of DC capacitors 29 included in all the transducer cells 10A of first power converter 1A, and calculates an average (hereinafter, average voltage VA) of the voltages.

At step S37, first control device 100A determines whether the initial charging of DC capacitors 29 included in first power converter 1A has been completed, based on whether average voltage VA has reached an initial charging level VIF or whether average voltage VA has been at initial charging level VIF for a few consecutive cycles. Initial charging level VIF can be determined in the same manner as Embodiment 1.

If the initial charging is determined to be incomplete at step S37 (S37: NO), the process returns to step S36, and first control device 100A repeats the process of determining the completion of the initial charging. If the initial charging of DC capacitor 29 is determined to be completed at step S37 (S37: YES), the process proceeds to step S38.

At step S38, main control device 200 notifies first control device 100A for first power converter 1A of an operation start command.

At step S39, first control device 100A for first power converter 1A, having received the operation start command, generates voltage command values Vcell+*, Vcell−* for outputting rated voltages to AC terminals 7UA, 7VA, 7WA and outputting a first reference level to first DC terminals 2A, 3A. Based on voltage command values Vcell+*, Vcell−*, first control device 100A performs a PWM control of semiconductor switching elements 21s, 22s. At this time, DC capacitor 29 is charged simultaneously. The control command value for the average of the voltages of DC capacitors 29 versus time is configured as a ramp function RC having a constant rate of increase, and command value VdcA* for DC voltage VdcA between first positive DC terminal 2A and first negative DC terminal 3A is configured as a ramp function RD having a constant rate of increase, the ramp function RD being depending on ramp function RC, thereby raising the average of voltages of DC capacitors 29 at the constant rate of increase and DC voltage VdcA at the constant rate of increase.

At step S40, first control device 100A obtains the magnitude of DC voltage VdcA by measurement or computation.

At step S41, first control device 100A determines whether the raising of DC voltage VdcA to the first reference level has completed, based on the magnitude of DC voltage VdcA, specifically, based on whether DC voltage VdcA has reached the first reference level or whether DC voltage VdcA has been at the first reference level for a few consecutive cycles. If the raising of DC voltage VdcA to the first reference level is determined to be incomplete (S41: NO), the process returns to step S40, and first control device 100A repeats the process of determining whether the raising has completed. If the raising of DC voltage VdcA to the first reference level is determined to be completed (S41: YES), and the process proceeds to step S42. The first reference level can be the rated voltage for first power converter 1A, or a voltage that is higher or smaller than the rated voltage by a few percentages.

At step S42, main control device 200 receives, from second control device 100B for second power converter 1B, a signal representing a level LB of the DC voltage that can be output from second power converter 1B, as information representing the status of second power converter 1B. Main control device 200 receives, from third control device 100C for third power converter 1C, a signal representing a level LC of the DC voltage that can be output from third power converter 1C, as information representing the status of third power converter 1C. At this time, the DC voltage levels LB and LC are compared, and a power converter corresponding to a greater DC voltage level is started up prior to the other. In the present embodiment, a description will be given, assuming that DC voltage level LB is greater than DC level LC.

Level LB of the DC voltage can be determined in the same manner as Embodiment 1. Level LC of the DC voltage can be determined by the following Equation (3), where average voltage VC indicates an average of voltages of DC capacitors 29 included in all the transducer cells 10C of third power converter 1C, and MD indicates a DC modulation rate. When MD is set to 0.5, LC is equal to average voltage VC.

$$LC = VC \times MD \times 2 \quad (3)$$

At step S43, first control device 100A for first power converter 1A reduces DC voltage VdcA at a constant rate of reduction. Command value VdcA* for DC voltage VdcA between first positive DC terminal 2A and first negative DC terminal 3A is configured as a ramp function having a constant rate of reduction, thereby causing DC voltage VdcA to fall at the constant rate of reduction.

At step S44, first control device 100A obtains the magnitude of DC voltage VdcA by measurement or computation.

At step S45, first control device 100A determines whether the magnitude of DC voltage VdcA has changed to level LB of the DC voltage that can be output from second power converter 1B obtained at step S42, based on whether the magnitude of DC voltage VdcA has reached level LB of the DC voltage or whether the magnitude of DC voltage VdcA has been at level LB of the DC voltage for a few consecutive cycles.

If the magnitude of DC voltage VdcA is determined as not having changed to level LB of the DC voltage that can be output from second power converter 1B (S45: NO), the process returns to step S44, and first control device 100A repeats the process of determining the completion of the change. If the magnitude of DC voltage VdcA is determined as having changed to level LB of the DC voltage that can be output from second power converter 1B (S45: YES), the process proceeds to step S46.

At step S46, second control device 100B for second power converter 1B receives an operation start command sent from main control device 200. Second control device 100B generates voltage command values Vcell+*, Vcell−* for rated voltages to AC terminals 7UB, 7VB, 7WB and outputting, to second DC terminals 2B, 3B, level LB of the DC voltage that can be output from second power converter 1B and transmitted at step S42, and performs a PWM control of semiconductor switching elements 21s, 22s. At this time, DC capacitors 29 in second power converter 1B are charged simultaneously. First control device 100A maintains the voltages of first DC terminals 2A, 3A at level LB of the DC voltage that can be output from second power converter 1B. This increases the voltages of DC capacitors 29 in second power converter 1B at a constant rate of change.

At step S47, second control device 100B obtains an average of voltages (hereinafter, average voltage VB) of DC capacitors 29 included in all the transducer cells 10B of second power converter 1B by measurement or computation.

At step S48, second control device 100B determines whether charging of DC capacitors 29 included in all the transducer cells 10B of second power converter 1B to the second reference level has completed, based on whether average voltage VB has reached the second reference level or whether average voltage VB has been at the second reference level for a few consecutive cycles. If changing of DC capacitors 29 to the second reference level is determined to be incomplete (S48: NO), the process returns to step S47, and second control device 100B repeats the operation of determining the completion of the charging. If changing of DC capacitors 29 to the second reference level is determined to be completed (S48: YES), the process proceeds to step S49. The second reference level can be the rated voltage for DC capacitors 29, or a voltage higher or smaller than the rated voltage by a few percentages.

At step S49, first control device 100A receives, from second control device 100B, information notifying that charging of DC capacitors 29 included in all the transducer cells 10B of second power converter 1B to the second reference level has completed, as information representing the status of second power converter 1B. Then, main control device 200 receives, from third control device 100C for third power converter 1C, a signal representing level LC of the DC voltage that can be output from third power converter 1C, as information representing the status of third power converter 1C. The information is sent to first control device 100A for first power converter 1A and second control device 100B for second power converter 1B.

First control device 100A for first power converter 1A and second control device 100B for second power converter 1B reduce DC voltages VdcA, VdcB to level LC of the DC voltage at a constant rate of reduction. Command value VdcA* for DC voltage VdcA between first positive DC terminal 2A and first negative DC terminal 3A is configured as a ramp function having a constant rate of reduction, thereby causing DC voltage VdcA to fall at the constant rate of reduction. Command value VdcB* for DC voltage VdcB between second positive DC terminal 2B and first negative DC terminal 3B is configured as a ramp function having a constant rate of reduction, thereby causing DC voltage VdcB to fall at the constant rate of reduction.

At step S50, first control device 100A and second control device 100B obtain the magnitudes of DC voltages VdcA, VdcB by measurement or computation.

At step S51, first control device 100A and second control device 100B determine whether the magnitudes of DC voltages VdcA, VdcB have changed to level LC of the DC voltage that can be output from third power converter 1C obtained at step S42, based on whether the magnitudes of DC voltages VdcA, VdcB have reached level LC of the DC voltage or whether the magnitudes of DC voltages VdcA, VdcB have been at level LC of the DC voltage for a few consecutive cycles.

If the magnitudes of DC voltages VdcA, VdcB are determined as not having changed to level LC of the DC voltage that can be output from third power converter 1C (S51: NO), the process returns to step S50, and first control device 100A and second control device 100B repeat the operation of determining the completion of the change. If the magnitudes of DC voltages VdcA, VdcB are determined as having changed to level LC of the DC voltage that can be output from third power converter 1C (S51: YES), the process proceeds to step S52.

At step S52, third control device 100C for third power converter 1C receives an operation start command sent from main control device 200. Third control device 100C generates voltage command values Vcell+*, Vcell−* for outputting rated voltages to AC terminals 7UB, 7VB, 7WB and outputting, to second DC terminals 2B, 3B, level LC of the DC voltage that can be output from third power converter 1C and transmitted at step S42, and performs a PWM control of semiconductor switching elements 21s, 22s. At this time, DC capacitors 29 in third power converter 1C are simultaneously charged. First control device 100A maintains the voltages of first DC terminals 2A, 3A at level LC of the DC voltage that can be output from third power converter 1C. This increases the voltages of DC capacitors 29 in third power converter 1C at a constant rate of change.

At step S53, third control device 100C obtains an average of voltages (hereinafter, average voltage VC) of DC capacitors 29 included in all the transducer cell 10C of third power converter 1C by measurement or computation.

At step S54, third control device 100C determines whether changing of DC capacitors 29 included in all the transducer cell 10C of third power converter 1C to the second reference level has completed, based on whether average voltage VC has reached the second reference level or whether average voltage VC have been at the second reference level for a few consecutive cycles. If charging of DC capacitors 29 to the second reference level is determined to be incomplete (S54: NO), the process returns to step S53, and third control device 100C repeats the operation of determining the completion of the charging. If changing of DC capacitors 29 to the second reference level is determined to be completed (S54: YES), the process proceeds to step S55.

At step S55, first control device 100A and second control device 100B receive, from third control device 100C, information notifying that charging of DC capacitors 29 included in all the transducer cells 10C of third power converter 1C to the second reference level has completed, as information representing the status of the second power converter 1C. First control device 100A raises command value VdcA* for DC voltage VdcA to a third reference level at a constant rate of change. Second control device 100B raises command value VdcB* for DC voltage VdcB to a fourth reference level at a constant rate of change. Third control device 100C raises command value VdcC* for the DC voltage VdcC to a fifth reference level at a constant rate of change. The third reference level can be the rated voltage for first power converter 1A, or a voltage higher or smaller than the rated voltage by a few percentages. The fourth reference level can be the rated voltage for second power converter 1B, or a voltage higher or smaller than the rated voltage by a few percentages. The fifth reference level can be the rated voltage for third power converter 1C, or a voltage higher or smaller than the rated voltage by a few percentages. Note that, preferably, the third reference level, the fourth reference level, and the fifth reference level are the same level for the prevention of inrush current caused by the potential differences between DC voltages VdcA, VdcB, VdcC.

At step S56, first control device 100A, second control device 100B, and third control device 100C obtain the magnitudes of DC voltages VdcA, VdcB, VdcC by measurement or computation.

At step S57, first control device 100A, second control device 100B, and third control device 100C determine whether the raising of DC voltages VdcA, VdcB, VdcC to the third reference level, the fourth reference level, and the fifth reference level has completed, based on whether the magnitudes DC voltages VdcA, VdcB, VdcC have reached the third reference level, the fourth reference level, and the fifth reference level or whether the magnitudes of DC voltages VdcA, VdcB, VdcC have been at the third reference level, the fourth reference level, and the fifth reference level for a few consecutive cycles. At step S58, if the raising of DC voltages VdcA, VdcB, VdcC to the third reference level, the fourth reference level, and the fifth reference level is determined to be incomplete (S57: NO), the process returns to step S56, and first control device 100A, second control device 100B, and third control device 100C repeat the process of determining the completions of the raising. If the raising of the DC voltages VdcA, VdcB, VdcC to the third reference level, the fourth reference level, and the fifth reference level is determined to be completed (S57: YES), the process proceeds to step S58.

At step S58, the startup is completed and the process transitions to a DC power transmission initiation operation. For example, first power converter 1A converts an AC power into a DC power, and second power converter 1B and third power converter 1C convert a DC power into an AC power, thereby transmitting the power from first power converter 1A to second power converter 1B and third power converter 1C.

For the startup of the power conversion system, main control device 200 may select a power converter to be started up first, from among first power converter 1A, second power converter 1B, and third power converter 1C, based on the information on AC systems 9A, 9B, 9C. This allows the power conversion system to operate stably, and allows for reduction of the effects on the AC system, such as variations in voltage of the AC system when charging the capacitors.

According to the present embodiment, in the three-terminal HVDC system, inrush current that flows into second power converters 1B, 1C can be reduced.

Note that first control device 100A, second control device 100B, and third control device 100C may directly communicate with each other, bypassing main control device 200.

Variation.

(1) The configurations of transducer cells 10A, 10B are not limited to those shown in FIGS. 3, 8, and 10, insofar as they allow the voltages of the capacitors connected in series to be selectively output by the switching operation.

The embodiments presently disclosed should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST 1A, 1B, 1C power converter; 2A, 2B, 2C positive DC terminal; 3A, 3B, 3C negative DC terminal; 4UA, 4VA, 4WA, 4UB, 4VB, 4WB arm; 5UA, 5VA, 5WA, 5UB, 5VB, 5WB positive arm; 6UA, 6VA, 6WA, 6UB, 6VB, 6WB negative arm; 7UA, 7VA, 7WA, 7UB, 7VB, 7WB AC terminal; 8A, 8B, 8C transformer; 9A, 9B, 9C AC system; 10A, 10B transducer cell; 11UA, 11VA, 11WA, 11UB, 11VB, 11WB positive arm reactor; 12UA, 12VA, 12WA, 12UB, 12VB, 12WB negative arm reactor; 13A, 13B, 13C AC circuit breaker; 14PA, 14PB, 14PC, 14NA, 14NB, 14NC DC circuit breaker; 15P, 15N, 15PA, 15NA, 15PB, 15NB, 15PC, 15NC DC transmission line; 21, 22, 31, 32, 33, 34, 41, 42, 43, 44 switch; 21$s$, 22$s$, 31$s$, 32$s$, 34$s$, 41$s$, 42$s$, 43$s$, 44$s$ semiconductor switching element; 21$d$, 22$d$, 31$d$, 32$d$, 33$d$, 34$d$, 41$d$, 42$d$, 43$d$, 44$d$ diode; 23, 35, 36, 45, 46 series body; 29, 39, 49 DC capacitor; 71$p$UA, 71$p$VA, 71$p$WA, 71$n$UA, 71$n$VA, 71$n$WA current detector; 73A, 73B, 74UA, 74VA, 74WA, 74UB, 74VB, 74WB voltage detector; 100A, 100B, 100C power converter; 110 conversion unit; 120 DC control unit; 130 AC control unit; 140 positive arm command value computing unit; 141 negative arm command value computing unit; 155 positive cell individual control unit; 156 negative cell individual control unit; 160 positive PWM circuit; 161 negative PWM circuit; 181 voltage command value generation unit; 182 PWM circuitry; 200 main control device; PBL, NBL DC bus; and UCA, VCA, WCA, UCB, VCB, WCB AC line.

The invention claimed is:

1. A power conversion system, comprising:
a first power converter capable of converting an alternating-current (AC) power into a direct-current (DC) power or converting a DC power into an AC power;
a second power converter capable of converting an AC power into a DC power or converting a DC power into an AC power;
a first control device that controls the first power converter; and
a second control device that controls the second power converter, wherein
the first power converter is interconnectable to a first AC system via a first AC circuit breaker, the second power converter is interconnectable to a second AC system via a second AC circuit breaker, and a first DC terminal of the first power converter and a second DC terminal of the second power converter are connectable to each other,
the first power converter and the second power converter each include a plurality of arms connected in parallel between a positive DC bus and a negative DC bus,
the plurality of arms each include a positive arm and a negative arm which are connected in series,
the positive arm and the negative arm each include one or more transducer cells which are connected in series,
the transducer cells each include:
a series body comprising a plurality of semiconductor switching elements connected in series; and
a DC capacitor connected in parallel with the series body,
the first power converter begins operation prior to the second power converter,
the first control device controls a voltage of the first DC terminal, based on a status of the second power converter sent from the second control device, and
the first control device and the second device directly communicate with each other.

2. The power conversion system according to claim 1, wherein after the first power converter begins operation, the first control device charges the DC capacitor included in the first power converter and the second power converter by controlling the voltage of the first DC terminal so that the voltage of the first DC terminal increases to a first reference level.

3. The power conversion system according to claim 2, wherein the first reference level is a rated voltage for the first power converter.

4. The power conversion system according to claim 2, wherein, after the voltage of the first DC terminal has increased to the first reference level, the first control device obtains a level of DC voltage that can be output from the second power converter as the status of the second power converter, decreases the voltage of the first DC terminal to the obtained level, after which the second control device starts operation of the second power converter.

5. The power conversion system according to claim 4, wherein the level of DC voltage that can be output from the second power converter is a value obtained based on an average voltage of all capacitors included in the second power converter and a DC voltage modulation rate.

6. The power conversion system according to claim 4, wherein
after the second power converter begins operation, the second control device charges the DC capacitor included in the second power converter to a second reference level by controlling a voltage of the second DC terminal so that the voltage of the second DC terminal is increased to the level of DC voltage that can be output from the second power converter.

7. The power conversion system according to claim 6, wherein the second reference level is a rated level of the DC capacitor.

8. The power conversion system according to claim 6, wherein after the DC capacitor included in the second power converter is charged to the second reference level, the first control device increases the voltage of the first DC terminal to a third reference level and the second control device increases the voltage of the second DC terminal to a fourth reference level.

9. The power conversion system according to claim 8, wherein the third reference level is a rated voltage for the first power converter, and the fourth reference level is a rated voltage for the second power converter.

10. The power conversion system according to claim 1, wherein
after the first control device turns on the first AC circuit breaker and the second control device turns on the second AC circuit breaker, the first control device causes the first power converter to begin operation once an average voltage of the DC capacitor included in the first power converter has reached an initial charging level.

11. The power conversion system according to claim 10, wherein
after the first power converter begins operation, the plurality of semiconductor switching elements included in the first power converter are driven by a voltage stored in the DC capacitor included in the first power converter.

12. The power conversion system according to claim 1, comprising a main control device that controls the first control device and the second control device, wherein
the main control device communicates with the first control device and the second control device.

13. The power conversion system according to claim 1, comprising:
a DC transmission line for connecting the first DC terminal and the second DC terminal;
a first DC circuit breaker between the first DC terminal and the DC transmission line; and
a second DC circuit breaker between the second DC terminal and the DC transmission line.

14. The power conversion system according to claim 1, comprising a main control device that determines the first power converter to be started up first, based on a status of one of the first AC system and the second AC system.

15. The power conversion system according to claim 1, wherein
the power conversion system is a Back to Back (BTB) system, and the first DC terminal and the second DC terminal are directly connected to each other.

16. The power conversion system according to claim 1, wherein
the power conversion system includes an HVDC system, and the first DC terminal and the second DC terminal are connected to a DC transmission line.

17. A power conversion device, comprising:
a power converter capable of converting an AC power into a DC power or converting a DC power into an AC power; and
a control device that controls the power converter, wherein
the power converter is interconnectable to an AC system via an AC circuit breaker, and a DC terminal of the power converter and a DC terminal of another power converter are connectable,
the power converter includes a plurality of arms connected in parallel between a positive DC bus and a negative DC bus,
the plurality of arms each include a positive arm and a negative arm connected in series, and a point of connection between the positive arm and the negative arm is connected to each phase AC line,
the positive arm and the negative arm each include one or more transducer cells connected in series,
the transducer cells each include
a series body which includes a plurality of semiconductor switching elements connected in series, and
a DC capacitor connected in parallel with the series body,
the power converter begins operation prior to the other power converter,
the control device controls a voltage of the DC terminal of the power converter, based on a status of the other power converter, and
the control device and the other power converter directly communicate with each other.

18. A power conversion device, comprising:
a power converter capable of converting an AC power into a DC power or converting a DC power into an AC power; and
a control device that controls the power converter, wherein
the power converter is interconnectable to an AC system via an AC circuit breaker, and a DC terminal of the power converter and a DC terminal of another power converter are connectable,
the power converter includes a plurality of arms connected in parallel between a positive DC bus and a negative DC bus,
the plurality of arms each include a positive arm and a negative arm connected in series, and a point of connection between the positive arm and the negative arm is connected to each phase AC line,
the positive arm and the negative arm each include one or more transducer cells connected in series,
the transducer cells each include
a series body which includes a plurality of semiconductor switching elements connected in series, and
a DC capacitor connected in parallel with the series body, wherein
the power converter begins operation prior to the other power converter,
the control device notifies another control device that controls the other power converter of a status of the power converter, and
the control device and the another control device directly communicate with each other.

* * * * *